(12) United States Patent
Morishita et al.

(10) Patent No.: US 11,536,474 B2
(45) Date of Patent: Dec. 27, 2022

(54) AIR-CONDITIONING SYSTEM CONTROLLING EVAPORATING TEMPERATURES OF INDOOR UNITS AND VENTILATOR

(71) Applicant: Mitsubishi Electric Corporation, Tokyo (JP)

(72) Inventors: Yuya Morishita, Tokyo (JP); Hiroyuki Morimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 343 days.

(21) Appl. No.: 16/605,074

(22) PCT Filed: Jun. 1, 2017

(86) PCT No.: PCT/JP2017/020497
§ 371 (c)(1),
(2) Date: Oct. 14, 2019

(87) PCT Pub. No.: WO2018/220803
PCT Pub. Date: Dec. 6, 2018

(65) Prior Publication Data
US 2020/0300489 A1    Sep. 24, 2020

(51) Int. Cl.
*F24F 11/30* (2018.01)
*F24F 11/64* (2018.01)
(Continued)

(52) U.S. Cl.
CPC ............ *F24F 11/30* (2018.01); *F24F 1/0003* (2013.01); *F24F 1/32* (2013.01); *F24F 7/007* (2013.01);
(Continued)

(58) Field of Classification Search
CPC .. F24F 11/30; F24F 11/64; F24F 11/65; F24F 11/56; F24F 11/52; F24F 1/0003;
(Continued)

(56) References Cited

U.S. PATENT DOCUMENTS 10,760,810 B2 * 9/2020 Nakashima .............. F24F 11/56
2008/0196432 A1 * 8/2008 Shimamoto ............. F25B 13/00
62/238.7

(Continued)

FOREIGN PATENT DOCUMENTS

JP    2000-065410 A    3/2000
JP    2005-036989 A    2/2005
(Continued)

OTHER PUBLICATIONS

Chenari, B., Carrilho, J.D. and da Silva, M.G., 2016. Towards sustainable, energy-efficient and healthy ventilation strategies in buildings: A review. Renewable and Sustainable Energy Reviews, 59, pp. 1426-1447. (Year: 2016).*
(Continued)

*Primary Examiner* — Alicia M. Choi
(74) *Attorney, Agent, or Firm* — Posz Law Group, PLC

(57) ABSTRACT

An air-conditioning system includes a refrigerant system in which an outdoor unit, one or more indoor units, and one or more ventilators are connected by a refrigerant pipe and in which refrigerant circulates, and a control device configured to control the refrigerant system. The control device includes a target temperature adjustment unit configured to adjust a target evaporating temperature based on a detection value detected by a temperature and humidity detection unit provided to at least one of the indoor unit and the ventilator that satisfies a specific criterion, and an air-conditioning control unit configured to control the refrigerant system such that the evaporating temperature of each of the indoor unit
(Continued)

and the ventilator is equal to the target evaporating temperature adjusted by the target evaporating temperature.

15 Claims, 15 Drawing Sheets

(51) Int. Cl.

| | | |
|---|---|---|
| F24F 11/65 | (2018.01) | |
| F24F 11/56 | (2018.01) | |
| F24F 11/52 | (2018.01) | |
| F24F 1/0003 | (2019.01) | |
| F24F 1/32 | (2011.01) | |
| F24F 7/007 | (2006.01) | |
| F24F 11/00 | (2018.01) | |
| G05B 15/02 | (2006.01) | |
| F24F 110/20 | (2018.01) | |
| F24F 110/22 | (2018.01) | |
| F24F 120/12 | (2018.01) | |
| F24F 110/10 | (2018.01) | |
| F24F 110/12 | (2018.01) | |

(52) U.S. Cl.
CPC .......... *F24F 11/0008* (2013.01); *F24F 11/52* (2018.01); *F24F 11/56* (2018.01); *F24F 11/64* (2018.01); *F24F 11/65* (2018.01); *G05B 15/02* (2013.01); *F24F 2110/10* (2018.01); *F24F 2110/12* (2018.01); *F24F 2110/20* (2018.01); *F24F 2110/22* (2018.01); *F24F 2120/12* (2018.01)

(58) Field of Classification Search
CPC .......... F24F 1/32; F24F 7/007; F24F 11/0008; F24F 2110/20; F24F 2110/22; F24F 2120/12; F24F 2110/10; F24F 2110/12; G05B 15/02
See application file for complete search history.

(56) References Cited

U.S. PATENT DOCUMENTS

| | | | |
|---|---|---|---|
| 2015/0040595 A1* | 2/2015 | Tamaki | F25B 29/003 |
| | | | 62/159 |
| 2015/0276290 A1* | 10/2015 | Aoyama | F25B 49/02 |
| | | | 62/226 |
| 2015/0277409 A1* | 10/2015 | Yamada | G05B 19/042 |
| | | | 700/276 |
| 2015/0285530 A1* | 10/2015 | Honda | F25B 13/00 |
| | | | 62/216 |
| 2015/0362200 A1* | 12/2015 | Hamada | F24F 11/83 |
| | | | 62/175 |
| 2016/0084511 A1 | 3/2016 | Hamada et al. | |
| 2016/0178225 A1* | 6/2016 | Vallikannu | F24F 11/30 |
| | | | 700/276 |
| 2016/0320113 A1* | 11/2016 | Sekiya | F24F 11/30 |
| 2018/0135878 A1* | 5/2018 | Iura | F24F 11/89 |
| 2019/0186759 A1* | 6/2019 | Komatsu | F24F 1/0059 |

FOREIGN PATENT DOCUMENTS

| | | | |
|---|---|---|---|
| JP | 2012-193901 A | 10/2012 | |
| JP | 2013-204899 A | 10/2013 | |
| JP | 5996107 B2 | 9/2016 | |
| JP | 6072221 B2 | 2/2017 | |
| KR | 10-0792520 | 1/2008 | |
| KR | 100810508 B1 * | 3/2008 | ............. F24F 11/30 |
| WO | 2015/173910 A1 | 11/2015 | |

OTHER PUBLICATIONS

International Search Report of the International Searching Authority dated Aug. 15, 2017 for the corresponding International application No. PCT/JP2017/020497 (and English translation).
Office Action dated Aug. 2, 2022 issued in corresponding DE Patent Application No. 112017007594.7 (and English translation).

* cited by examiner

|  | INDOOR HEAT EXCHANGER | | VENTILATOR COOLER | |
|---|---|---|---|---|
| EVAPO-RATING TEMPERA-TURE LEVEL | MAXIMUM EVAPORATING TEMPERATURE ET_max | MINIMUM EVAPORATING TEMPERATURE ET_min | MAXIMUM EVAPORATING TEMPERATURE ET_max | MINIMUM EVAPORATING TEMPERATURE ET_min |
| Hi LEVEL | ETi_hi_max | ETi_hi_min | ETv_hi_max | ETv_hi_min |
| Lo LEVEL | ETi_lo_max | ETi_lo_min | ETv_lo_max | ETv_lo_min |

AIR-CONDITIONING SYSTEM CONTROLLING EVAPORATING TEMPERATURES OF INDOOR UNITS AND VENTILATOR

CROSS REFERENCE TO RELATED APPLICATION

This application is a U.S. national stage application of PCT/JP2017/020497 filed on Jun. 1, 2017, the contents of which are incorporated herein by reference.

TECHNICAL FIELD

The present invention relates to an air-conditioning system including an air-conditioning apparatus and a ventilator.

BACKGROUND ART

In air-conditioning systems including an air-conditioning apparatus and a ventilator, the ventilator performs a ventilation operation to replace air in an air-conditioned space with outside air. If air introduced from the outside during cooling operation has high enthalpy, this results in increased cooling load. Examples of heat loads in air-conditioning systems other than a cooling load include an indoor load generated indoors and a building structure load entering through a wall or other areas of a building.

With existing air-conditioning systems, the evaporating temperature of the indoor heat exchanger of an air-conditioning apparatus is kept at a low, constant temperature to thereby handle a latent heat load among the above-mentioned heat loads. Such an operation of keeping the evaporating temperature at a low, constant temperature in order to handle a latent heat load leads to decreased operating efficiency. Although operating efficiency can be increased by increasing the evaporating temperature, this may cause indoor humidity to rise due to insufficient amount of latent heat handled, leading to decreased comfort.

Accordingly, to provide an improved method for setting evaporating temperature, latent-sensible heat separation air-conditioning systems have been hitherto proposed that are capable of handling latent heat and sensible heat separately (see, for example, Patent Literatures 1 and 2). The air-conditioning system described in each of Patent Literatures 1 and 2 calculates a temperature difference between an indoor target temperature and an indoor temperature, and a humidity difference between an indoor target absolute humidity and an indoor absolute humidity, and sets a target evaporating temperature by using the difference between a given threshold and each of the calculated temperature difference and the calculated humidity difference.

CITATION LIST

Patent Literature

Patent Literature 1: Japanese Patent No. 5996107
Patent Literature 2: Japanese Patent No. 6072221

SUMMARY OF INVENTION

Technical Problem

Conventional air-conditioning systems such as those described in Patent Literatures 1 and 2 acquire an indoor temperature and an indoor absolute humidity from a given temperature and humidity detection unit. This means that, in some cases, even if at least one of the air-conditioning apparatus and the ventilator is installed in a place with large air-conditioning load and low air-conditioning priority, the air-conditioning system uses a detection value acquired from a temperature and humidity detection unit provided to the air-conditioning apparatus or ventilator that is located in such a place.

Conceivable examples of places with large air-conditioning load and low air-conditioning priority include places subject to large outside-air intrusion and where people are not always present, such as entrance halls or elevator halls. Using a detection value detected by a temperature and humidity detection unit disposed in such a place results in a relatively large temperature difference or humidity difference being obtained by calculation. This means that the target evaporating temperature is set lower than when the target evaporating temperature is calculated by using a detection value detected by a temperature and humidity detection unit disposed in another place. In other words, with conventional air-conditioning systems, a low target evaporating temperature is set even under situations in which it would be possible to increase evaporating temperature without deteriorating comfort. Changes in evaporating temperature are thus hindered. This makes it impossible to increase operating efficiency and consequently energy saving performance.

The present invention has been made to address the above-mentioned problem. Accordingly, it is an object of the present invention to provide an air-conditioning system that allows for energy saving without deteriorating comfort.

Solution to Problem

An air-conditioning system according to an embodiment of the present invention includes a refrigerant system in which an outdoor unit, one or more indoor units, and one or more ventilators are connected by a refrigerant pipe and in which refrigerant circulates, and a control device configured to control the refrigerant system. The refrigerant system includes a compressor, an outdoor heat exchanger, a first expansion valve, an indoor heat exchanger, a second expansion valve, and a ventilator cooler. The outdoor unit includes the compressor, and the outdoor heat exchanger. The indoor unit includes the indoor heat exchanger. The ventilator includes the ventilator cooler. The indoor unit and the ventilator are each provided with a temperature and humidity detection unit configured to detect a temperature and a humidity of air in an air-conditioned space. The control device includes a target temperature adjustment unit, and an air-conditioning control unit. The target temperature adjustment unit is configured to identify at least one of the indoor unit and the ventilator that satisfies a specific criterion based on location within the air-conditioned space, and adjust a target evaporating temperature based on a detection value detected by the temperature and humidity detection unit provided to the identified at least one of the indoor unit or the ventilator. The air-conditioning control unit is configured to control the refrigerant system such that an evaporating temperature of each of the indoor unit and the ventilator is equal to the target evaporating temperature adjusted by the target evaporating temperature.

Advantageous Effects of Invention

According to an embodiment of the present invention, a target evaporating temperature is adjusted based on a detection value detected by a temperature and humidity detection unit provided to at least one of the indoor unit and the ventilator that satisfies a specific criterion. Accordingly, a temperature and humidity detection unit disposed in a place with low air-conditioning priority is not used. This allows for energy saving without deteriorating comfort.

DESCRIPTION OF EMBODIMENTS

Embodiment 1

Figure 1:
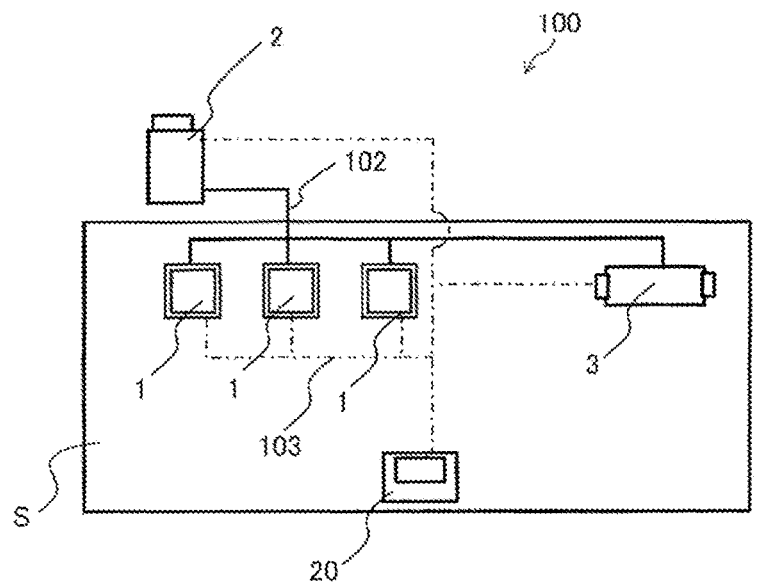
FIG. 1 schematically illustrates an air-conditioning system according to Embodiment 1 of the present invention.

FIG. 1 schematically illustrates an air-conditioning system according to Embodiment 1 of the present invention. An air-conditioning system 100 is used for multi-air-conditioning units for buildings or such air-conditioning units. The air-conditioning system 100 includes one or more indoor units 1, one or more ventilators 3, and an outdoor unit 2. The air-conditioning system 100 also includes a centralized controller 20 that controls and manages each indoor unit 1, each outdoor unit 2, and the ventilator 3 in a centralized manner. The centralized controller 20 corresponds to "control apparatus" according to the present invention. Hereinafter, one or more indoor units 1 will be collectively referred to as "indoor unit 1", and one or more ventilators 3 will be collectively referred to as "ventilator 3". FIG. 1 depicts an exemplary case in which the air-conditioning system 100 includes three indoor units 1, and a single ventilator 3.

The indoor unit 1 is configured to circulate air in an air-conditioned space S while adjusting the temperature of the air. The air in the air-conditioned space S will be also referred to as indoor air hereinafter. The ventilator 3 is configured to replace indoor air with outside air, and also dehumidify outside air introduced into the air-conditioned space S by cooling the outside air with a ventilator heat exchanger 18 described later. The indoor unit 1 and the ventilator 3 are each connected to the outdoor unit 2 via a refrigerant pipe 102. The indoor unit 1, the outdoor unit 2, and the ventilator 3 are each connected to the centralized controller 20 via a transmission line 103. Alternatively, however, the centralized controller 20 may communicate with each of the indoor unit 1, the outdoor unit 2, and the ventilator 3 in a wireless manner.

Figure 2:
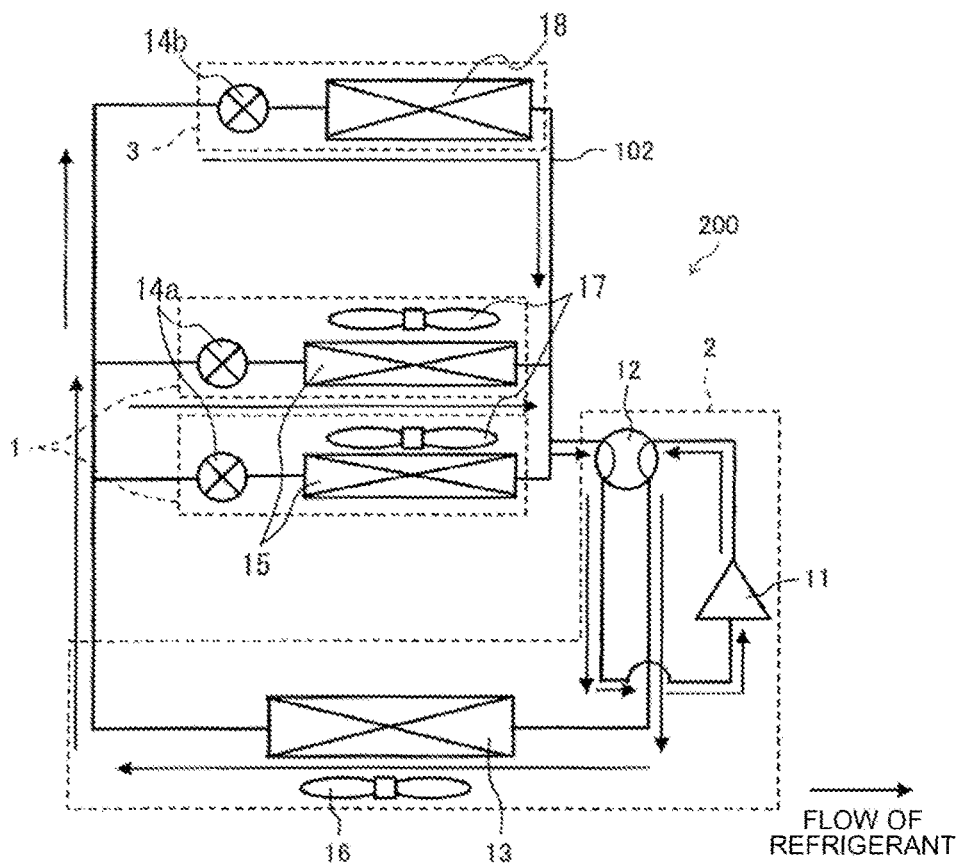
FIG. 2 is a refrigerant circuit diagram illustrating the flow of refrigerant in cooling operation of the air-conditioning system illustrated in FIG. 1.

FIG. 2 is a refrigerant circuit diagram illustrating the flow of refrigerant in cooling operation of the air-conditioning system illustrated in FIG. 1. The indoor unit 1 includes a first expansion valve 14a, an indoor heat exchanger 15, and an indoor fan 17. The outdoor unit 2 includes a compressor 11, a four-way valve 12, an outdoor heat exchanger 13, and an outdoor fan 16. The ventilator 3 includes a second expansion valve 14b, and the ventilator heat exchanger 18. In the air-conditioning system 100, the compressor 11, the four-way valve 12, the outdoor heat exchanger 13, the first expansion valve 14a, the indoor heat exchanger 15, the second expansion valve 14b, and the ventilator heat exchanger 18 are connected by the refrigerant pipe 102 to form a refrigerant circuit 200 serving as a refrigerant system in which refrigerant circulates. In FIG. 2, one of the indoor units 1 is not depicted for simplicity of illustration.

Figure 3:
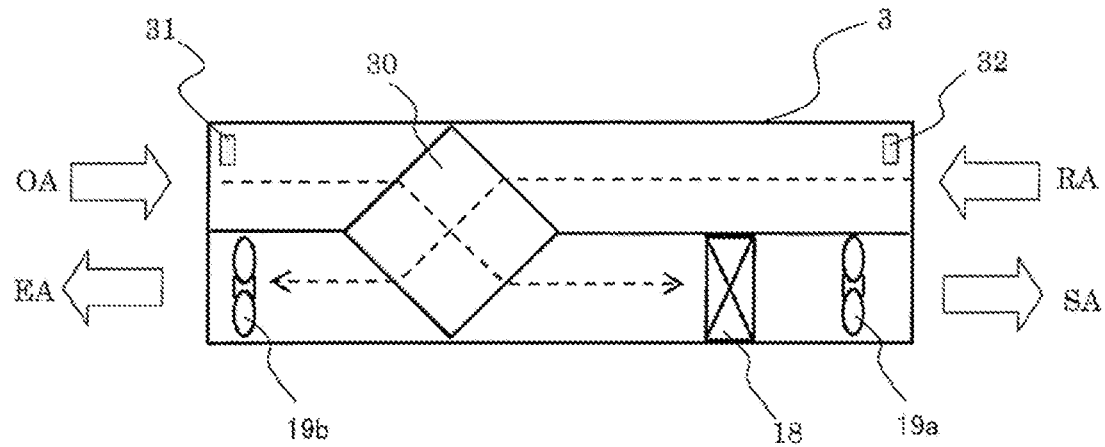
FIG. 3 illustrates a schematic configuration of a ventilator of the air-conditioning system illustrated in FIG. 1.

FIG. 3 illustrates a schematic configuration of the ventilator of the air-conditioning system illustrated in FIG. 1. As illustrated in FIG. 3, the ventilator 3 further includes a supply fan 19a, an exhaust fan 19b, and a total heat exchanger 30 that allows for total heat exchange between indoor air (RA) and outside air (OA). The ventilator 3 also includes an OA temperature and humidity detection unit 31 that detects the temperature and absolute humidity of outside air (OA), and an RA temperature and humidity detection unit 32 that detects the temperature and absolute humidity of indoor air (RA). The outside air (OA) that has undergone total heat exchange is supplied indoors as supply air (SA), and the indoor air (RA) that has undergone total heat exchange is discharged outdoors as exhaust air (EA).

Figure 4:
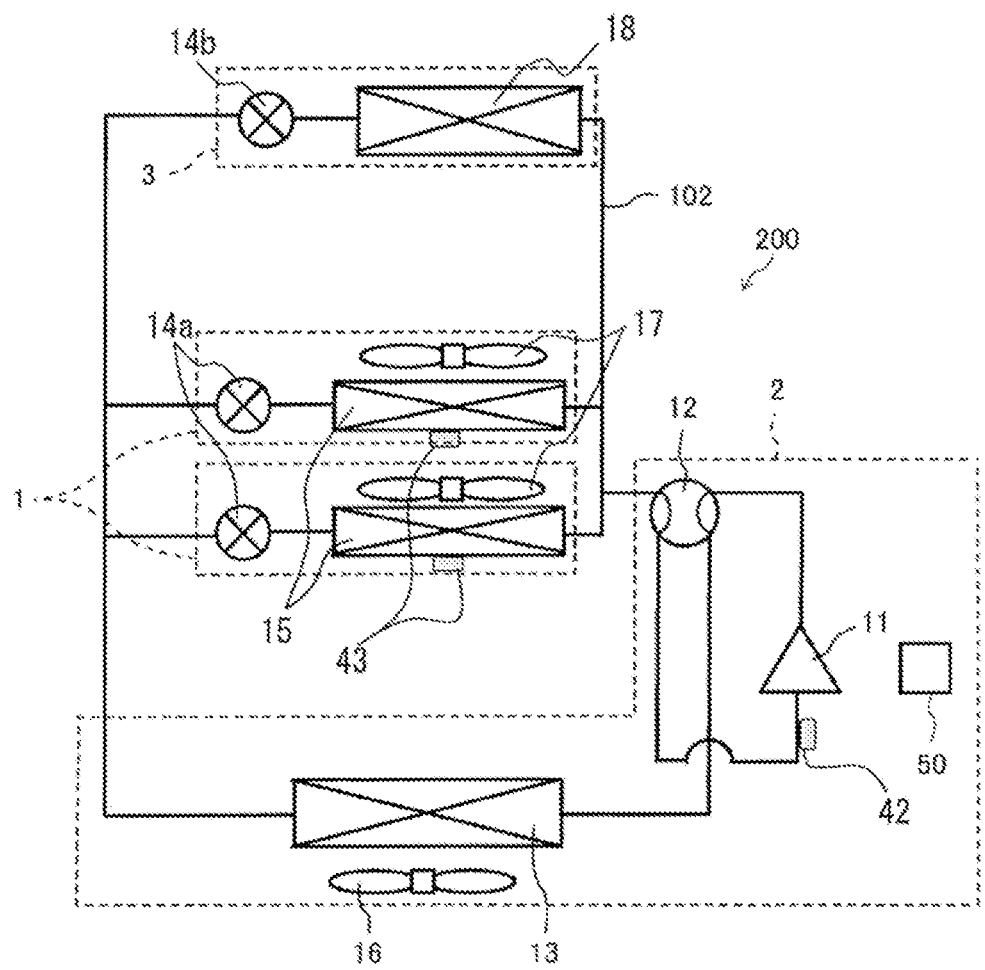
FIG. 4 is a refrigerant circuit diagram including the control system of the air-conditioning system illustrated in FIG. 1.

FIG. 4 is a refrigerant circuit diagram including the control system of the air-conditioning system illustrated in FIG. 1. As illustrated in FIG. 4, the outdoor unit 2 further includes a control device 50 that controls the refrigerant circuit 200 in cooperation with the centralized controller 20. The outdoor unit 2 is provided with an evaporating temperature detection unit 42 disposed on the suction side of the compressor 11. The evaporating temperature detection unit 42 is implemented by, for example, a thermistor. The evaporating temperature detection unit 42 is a temperature sensor that detects evaporating temperature in the refrigerant circuit 200. In each indoor unit 1, a suction temperature and humidity detection unit 43 is disposed near the air inlet through which air in the air-conditioned space S is sucked in. The suction temperature and humidity detection unit 43 is a temperature and humidity sensor that detects suction temperature, which is the temperature of indoor air, and suction humidity, which is the absolute humidity of indoor air.

With the air-conditioning system 100, the temperature of indoor air detected by the RA temperature and humidity detection unit 32, or the suction temperature detected by the suction temperature and humidity detection unit 43 can be used as an indoor temperature Ta, which is used in setting the evaporating temperature level. Further, with the air-conditioning system 100, the absolute humidity of indoor air detected by the RA temperature and humidity detection unit 32, or the suction humidity detected by the suction temperature and humidity detection unit 43 can be used as an indoor absolute humidity Xa, which is used in setting the evaporating temperature level. In this regard, the RA temperature and humidity detection unit 32 and the suction temperature and humidity detection unit 43 correspond to "temperature and humidity detection unit" according to the present invention, and will be often collectively referred to as "temperature and humidity sensor" hereinafter.

Figure 5:
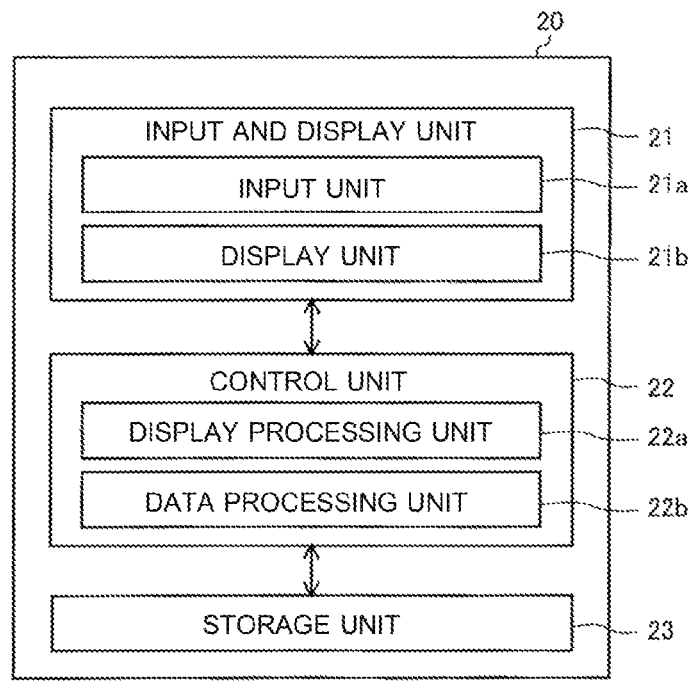
FIG. 5 is a block diagram illustrating the functional configuration of a centralized controller illustrated in FIG. 1.

FIG. 5 is a block diagram illustrating the functional configuration of the centralized controller illustrated in FIG. 1. The centralized controller 20 manages the overall control of the air-conditioning system 100 in a centralized manner. The centralized controller 20 is capable of providing various instructions to the outdoor unit 2 and the ventilator 3. The centralized controller 20 transmits, to the control device 50, specific criterion information corresponding to a specific criterion based on location within the air-conditioned space S. Hereinafter, a specific criterion based on location within the air-conditioned space S will be also referred to as "specific criterion".

As illustrated in FIG. 5, the centralized controller 20 includes an input and display unit 21, a control unit 22, and a storage unit 23. In Embodiment 1, the input and display unit 21 is a touch screen with an input unit 21a and a display unit 21b being stacked one on another. The input unit 21a accepts an input operation made by a user, and outputs a signal corresponding to the accepted input operation to the control unit 22. The display unit 21b is implemented by, for example, a liquid crystal display (LCD). The display unit 21b is controlled by the control unit 22 to display text, an image, or other information.

More specifically, the input unit 21a accepts a user's operation of setting an indoor target temperature Ta_tgt and an indoor target absolute humidity Xa_tgt for each of the indoor unit 1 and the ventilator 3. An indoor target temperature Ta_tgt refers to a set value of the temperature of indoor air, and an indoor target absolute humidity Xa_tgt refers to a set value of the absolute humidity of indoor air. The input unit 21a also accepts a user's operation of setting an air-conditioning priority for each of the indoor unit 1 and the ventilator 3. In Embodiment 1, an air-conditioning priority is determined based on a location within the air-conditioned space S, and corresponds to the magnitude of effect on comfort. That is, a place with low air-conditioning priority refers to a place that does not satisfy a specific criterion, in other words, a place with a relatively small effect on comfort. By contrast, a place with high air-conditioning priority refers to a place that satisfies a specific criterion, that is, a place with a relatively large effect on comfort.

A user's operation of setting an air-conditioning priority for each of the indoor unit 1 and the ventilator 3 also includes selecting at least one of the indoor unit 1 and the ventilator 3. Hereinafter, the indoor unit 1 and the ventilator 3 will be often collectively referred to as "air-conditioning apparatus". For example, the input unit 21a may accept a user's operation of selecting, from among the indoor unit 1 and the ventilator 3, an air-conditioning apparatus with a relatively low air-conditioning priority. In this case, a user can select, via the input unit 21a, an air-conditioning apparatus for which the user considers that departure of the indoor temperature Ta from the indoor target temperature Ta_tgt does not pose a problem. Alternatively, the input unit 21a may accept a user's operation of selecting, from among the indoor unit 1 and the ventilator 3, an air-conditioning apparatus with a relatively high air-conditioning priority. In this case, the user may select, via the input unit 21a, an air-conditioning apparatus that the user considers to have a relatively large effect on comfort.

The control unit 22 includes a display processing unit 22a, and a data processing unit 22b. The display processing unit 22a performs processes in accordance with an input operation made by a user, such as displaying text, an image, and other information on the display unit 21b, or changing information displayed on the display unit 21b.

The data processing unit 22b acquires, via the input unit 21a, target temperature and humidity information, which represents information on indoor target temperature Ta_tgt and indoor target absolute humidity Xa_tgt, and stores the acquired target temperature and humidity information into the storage unit 23.

Further, the data processing unit 22b transmits the target temperature and humidity information to the control device 50. That is, the data processing unit 22b functions as a target temperature and humidity setting unit that sets the indoor target temperature Ta_tgt and the indoor target absolute humidity Xa_tgt in cooperation with the input unit 21a.

The data processing unit 22b acquires, via the input unit 21a, information on settings on the air-conditioning priority of each air-conditioning apparatus, and transmits the acquired information to the control device 50 of the indoor unit 1 as specific criterion information. For example, if an air-conditioning apparatus with low air-conditioning priority is selected via the input unit 21a from among plural air-conditioning apparatuses, the data processing unit 22b transmits the address of the selected air-conditioning apparatus to the control device 50 as specific criterion information. In this case, the specific criterion information includes the address of the air-conditioning apparatus to be excluded in performing an adjustment of a target evaporating temperature Te. By transmitting the specific criterion information to the control device 50, the data processing unit 22b requests that the selected air-conditioning apparatus be excluded. In this regard, the "address" of an air-conditioning apparatus corresponds to "identification information" of an air-conditioning apparatus according to the present invention.

The control unit 22 can be implemented by hardware such as a circuit device that implements each of the above-mentioned functions, or can be implemented by, for example, software executed on a processing unit such as a microcomputer, a digital signal processor (DSP), or a central processing unit (CPU).

The storage unit 23 stores various data such as the indoor target temperature Ta_tgt and the indoor target absolute humidity Xa_tgt. The storage unit 23 may store an operating program for the control unit 22. The storage unit 23 may include a random access memory (RAM) and a read only memory (ROM), a programmable ROM (PROM) such as a flash memory, a hard disk drive (HDD), or other devices.

Figure 6:
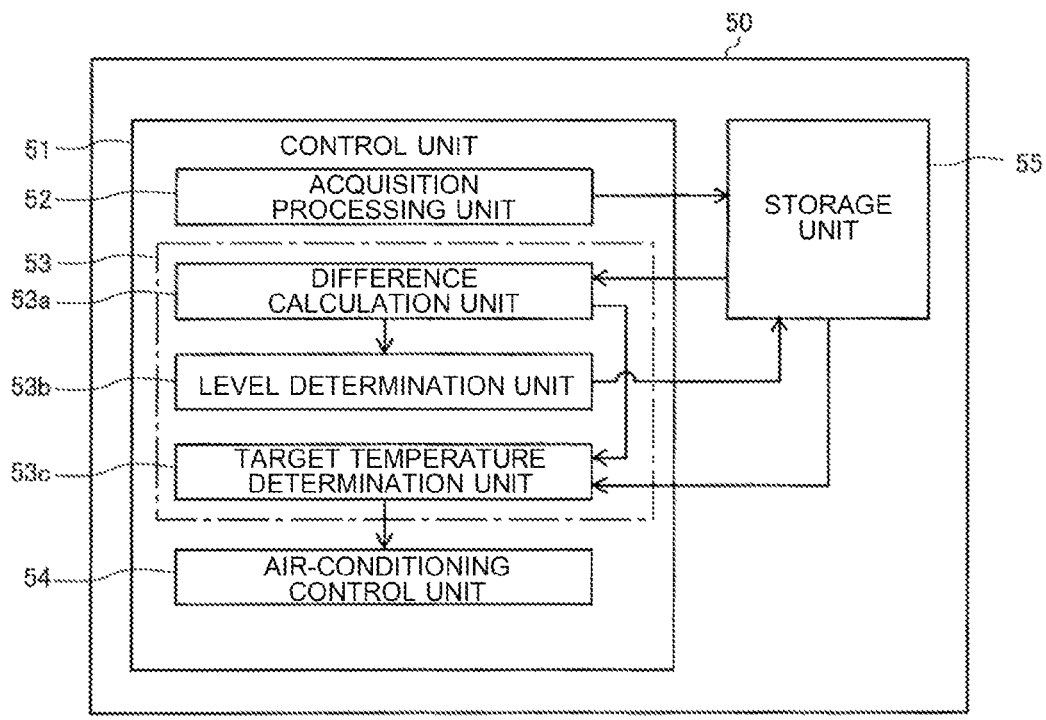
FIG. 6 is a block diagram illustrating the functional configuration of a control device illustrated in FIG. 4.
Figures 7, 8:
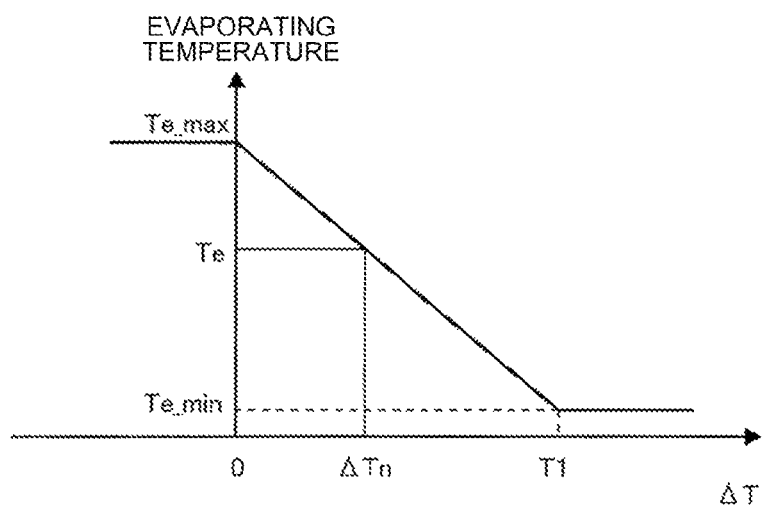
FIG. 7 is a graph illustrating target temperature derivation information used to obtain a target evaporating temperature for each of an indoor heat exchanger and a ventilator cooler that are illustrated in FIG. 2.
FIG. 8 is a table illustrating the setting range of target evaporating temperature for each of the indoor heat exchanger and the ventilator cooler that are illustrated in FIG. 2.

FIG. 6 is a block diagram illustrating the functional configuration of the control device illustrated in FIG. 4. FIG. 7 is a graph illustrating target temperature derivation information used to obtain a target evaporating temperature for each of the indoor heat exchanger and the ventilator cooler that are illustrated in FIG. 2. FIG. 8 is a table illustrating the setting range of target evaporating temperature for each of the indoor heat exchanger and the ventilator cooler that are illustrated in FIG. 2. With reference to FIGS. 6 to 8, the configuration of the control device 50 of the outdoor unit 2 will be described more specifically.

As illustrated in FIG. 6, the control device 50 includes a control unit 51, and a storage unit 55. The storage unit 55 stores various data such as monitored-apparatus information, which represents information on the address of each air-conditioning apparatus to be monitored, and level setting information, which represents evaporating temperature level. In default state, the monitored-apparatus information includes the respective addresses of the indoor unit 1 and the ventilator 3. In the case of the configuration in FIG. 1, in default state, the storage unit 55 stores the following pieces of information as monitored-apparatus information: the respective addresses of three indoor units 1, and the address of a single ventilator 3. The storage unit 55 may store an operating program for the control unit 51.

The storage unit 55 stores target temperature derivation information as illustrated in FIG. 7. In FIG. 7, the vertical axis represents the evaporating temperature of the indoor heat exchanger 15 or the ventilator heat exchanger 18, and the horizontal axis represents temperature difference ΔT, which is obtained by subtracting the indoor target temperature Ta_tgt from the indoor temperature Ta. A temperature difference ΔTn is an exemplary value obtained by subtracting the indoor target temperature Ta_tgt from the current indoor temperature Ta. That is, as illustrated in FIG. 7, the target temperature derivation information associates the temperature difference ΔT with the target evaporating temperature Te. By checking the temperature difference ΔTn against the target temperature derivation information, the corresponding target evaporating temperature Te can be obtained. Te_max represents maximum evaporating temperature, which is the maximum value of target evaporating temperature Te. Te_min represents minimum evaporating temperature, which is the minimum value of target evaporating temperature Te.

For the target temperature derivation information, with the temperature difference ΔT in the range "0<ΔT<T1", there is a proportional relationship between the temperature difference ΔT and the target evaporating temperature Te such that the target evaporating temperature Te decreases with increasing temperature difference ΔT. T1 is a predetermined temperature threshold. Further, the target temperature derivation information is such that, when the temperature difference ΔT is less than or equal to zero, the target evaporating temperature Te is set to the maximum evaporating temperature ET_max, and when the temperature difference ΔT is greater than or equal to T1, the target evaporating temperature Te is set to the minimum evaporating temperature ET_min.

In FIG. 8, the maximum evaporating temperature ET_max corresponds to the maximum evaporating temperature Te_max in FIG. 7, and the minimum evaporating temperature ET_min corresponds to the minimum evaporating temperature Te_min in FIG. 7. The maximum evaporating temperature Te_max and the minimum evaporating temperature Te_min are set in association with each of the indoor heat exchanger 15 and the ventilator heat exchanger 18. Further, as the maximum evaporating temperature Te_max and the minimum evaporating temperature Te_min, plural patterns of values are stored for each evaporating temperature level. In Embodiment 1, as evaporating temperature level, the following two patterns of values are set as illustrated in FIG. 8: Hi level with relatively high evaporating temperature, and Lo level with relatively low evaporating temperature. In other words, for each of the maximum evaporating temperature Te_max and the minimum evaporating temperature Te_min, a Hi-level value, and an Lo-level value lower than the Hi-level value are set.

That is, in Embodiment 1, the storage unit 55 stores the following pieces of information as target temperature derivation information: first target temperature derivation information corresponding to Hi level for the indoor heat exchanger 15; second target temperature derivation information corresponding to Lo level for the indoor heat exchanger 15; third target temperature derivation information corresponding to Hi level for the ventilator heat exchanger 18; and fourth target temperature derivation information corresponding to Lo level for the ventilator heat exchanger 18. The first target temperature derivation information and the third target temperature derivation information each correspond to "high target temperature derivation information" according to the present invention, and the second target temperature derivation information and the fourth target temperature derivation information each correspond to "low target temperature derivation information" according to the present invention.

For the first target temperature derivation information, the maximum evaporating temperature is set to ETi_hi_max, and the minimum evaporating temperature is set to ETi_hi_min. For the second target temperature derivation information, the maximum evaporating temperature is set to ETi_lo_max, and the minimum evaporating temperature is set to ETi_lo_min. For the third target temperature derivation information, the maximum evaporating temperature is set to ETv_hi_max, and the minimum evaporating temperature is set to ETv_hi_min. For the fourth target temperature derivation information, the maximum evaporating temperature is set to ETv_lo_max, and the minimum evaporating temperature is set to ETv_lo_min.

Accordingly, when set to Hi level, the target evaporating temperature Te of the indoor heat exchanger 15 is set in accordance with the temperature difference ΔT to a temperature in the range between the maximum evaporating temperature ETi_hi_max and the minimum evaporating temperature ETi_hi_min. Likewise, the target evaporating temperature Te of the ventilator heat exchanger 18 is set in accordance with the temperature difference ΔT to a temperature in the range between the maximum evaporating temperature ETv_hi_max and the minimum evaporating temperature ETv_hi_min. When set to Lo level, the target evaporating temperature Te of the indoor heat exchanger 15 is set in accordance with the temperature difference ΔT to a temperature in the range between the maximum evaporating temperature ETi_lo_max and the minimum evaporating temperature ETi_lo_min.

Likewise, the target evaporating temperature Te of the ventilator heat exchanger 18 is set in accordance with the temperature difference ΔT to a temperature in the range between the maximum evaporating temperature ETv_lo_max and the minimum evaporating temperature ETv_lo_min.

With regard to Hi level, ETi_hi_max in the first target temperature derivation information, and the maximum evaporating temperature ETv_hi_max in the third target temperature derivation information may be the same value or may be different values. The minimum evaporating temperature ETi_hi_min in the first target temperature derivation information, and the minimum evaporating temperature ETv_hi_min in the third target temperature derivation information may be the same value or may be different values. Likewise, with regard to Lo level, the maximum evaporating temperature ETi_lo_max in the second target temperature derivation information, and the maximum evaporating temperature ETv_lo_max in the fourth target temperature derivation information may be the same value or may be different values. The minimum evaporating temperature ETi_lo_min in the second target temperature derivation information, and the minimum evaporating temperature ETv_lo_min in the fourth target temperature derivation information may be the same value or may be different values.

As illustrated in FIG. 6, the control unit 51 includes an acquisition processing unit 52, a target temperature adjustment unit 53, and an air-conditioning control unit 54. The acquisition processing unit 52 stores the indoor target temperature Ta_tgt and the indoor target absolute humidity Xa_tgt, which are transmitted from the data processing unit 22b, into the storage unit 55.

Further, the acquisition processing unit 52 stores, into the storage unit 55, specific criterion information transmitted from the data processing unit 22b, and updates monitored-apparatus information. For example, if the address of an air-conditioning apparatus to be excluded in performing an adjustment of the target evaporating temperature Te is transmitted from the data processing unit 22b as specific criterion information, the acquisition processing unit 52 stores the address into the storage unit 55. At this time, the acquisition processing unit 52 excludes the address serving as specific criterion information from monitored-apparatus information to thereby update the monitored-apparatus information. Further, if the address of an air-conditioning apparatus to be used in performing an adjustment of the target evaporating temperature Te is transmitted from the data processing unit 22b as specific criterion information, the acquisition processing unit 52 rewrites monitored-apparatus information by using this address to thereby update the monitored-apparatus information. Through these processes, the address of an air-conditioning apparatus that the user considers to have a relatively small effect on comfort is excluded from the monitored-apparatus information. In Embodiment 1, an air-conditioning apparatus whose address is included in the monitored-apparatus information that has been updated by the acquisition processing unit 52 corresponds to an air-conditioning apparatus that satisfies a specific criterion.

The target temperature adjustment unit 53 identifies at least one of the indoor unit 1 and the ventilator 3 that satisfies a specific criterion, and adjusts the target evaporating temperature Te based on a detection value detected by a temperature and humidity sensor provided to the identified at least one of the indoor unit 1 and the ventilator 3. The target temperature adjustment unit 53 includes a difference calculation unit 53a, a level determination unit 53b, and a target temperature determination unit 53c.

The difference calculation unit 53a obtains the temperature difference ΔT by subtracting the indoor target temperature Ta_tgt from the indoor temperature Ta. The difference calculation unit 53a also obtains a humidity difference ΔX by subtracting the indoor target absolute humidity Xa_tgt from the indoor absolute humidity Xa. The difference calculation unit 53a then outputs the obtained temperature difference ΔT and the obtained humidity difference ΔX to the level determination unit 53b. The difference calculation unit 53a also outputs the obtained temperature difference ΔT to the target temperature determination unit 53c.

The difference calculation unit 53a acquires a detection value from each of the RA temperature and humidity detection unit 32 and the suction temperature and humidity detection unit 43. In obtaining the temperature difference ΔT and the humidity difference ΔX, the difference calculation unit 53a references monitored-apparatus information to identify a temperature and humidity sensor from which to acquire the indoor temperature Ta, and a temperature and humidity sensor from which to acquire the indoor absolute humidity Xa. That is, the difference calculation unit 53a does not use a detection value detected by a temperature and humidity sensor of an air-conditioning apparatus whose address has been excluded from monitored-apparatus information by the acquisition processing unit 52.

In Embodiment 1, if the address of every indoor unit 1 has not been excluded from monitored-apparatus information, the difference calculation unit 53a uses, as the indoor temperature Ta, the suction temperature detected by the suction temperature and humidity detection unit 43 of the indoor unit 1. If the air-conditioning system 100 includes plural indoor units 1, the indoor unit 1 from which the difference calculation unit 53a acquires the indoor temperature Ta is set in advance in accordance with the installation environment or other conditions. If the address of every indoor unit 1 has been excluded from monitored-apparatus information, the difference calculation unit 53a uses, as the indoor temperature Ta, the temperature of indoor air detected by the RA temperature and humidity detector 32.

If the address of every ventilator 3 has not been excluded from monitored-apparatus information, the difference calculation unit 53a uses, as the indoor absolute humidity Xa, the absolute humidity of indoor air detected by the RA temperature and humidity detector 32. If the air-conditioning system 100 includes plural ventilators 3, the ventilator 3 from which the difference calculation unit 53a acquires the indoor absolute humidity Xa is set in advance in accordance with the installation environment or other conditions. If the address of every ventilator 3 has been excluded from monitored-apparatus information, the difference calculation unit 53a uses, as the indoor absolute humidity Xa, the suction humidity detected by the suction temperature and humidity detection unit 43 of the indoor unit 1.

The level determination unit 53b determines whether a temperature and humidity condition is satisfied. The temperature and humidity condition is that the temperature difference ΔT is less than or equal to the temperature threshold T1, and that the humidity difference ΔX is less than or equal to a preset humidity threshold X1. Cases where the temperature and humidity condition is not satisfied include the following: a case in which the temperature difference ΔT is less than or equal to the temperature threshold T1, but the humidity difference ΔX is greater than the humidity threshold X1; a case in which the humidity difference ΔX is less than or equal to the humidity threshold X1, but the temperature difference ΔT is greater than the temperature threshold T1; and a case in which the temperature difference ΔT is greater than the temperature threshold T1, and the humidity difference ΔX is greater than the humidity threshold X1.

The level determination unit 53b also updates level setting information within the storage unit 55 based on the result of determination as to whether the temperature and humidity condition is satisfied. That is, if, with level setting information being set to Hi level, the temperature difference ΔT and the humidity difference ΔX cease to satisfy the temperature and humidity condition, the level determination unit 53b changes the level setting information to Lo level. Further, if, with level setting information being set to Lo level, the temperature difference ΔT and the humidity difference ΔX become to satisfy the temperature and humidity condition, the target temperature determination unit 53c changes the level setting information to Hi level. In other words, the air-conditioning system 100 transitions to operation at Lo level if the temperature and humidity condition ceases to be satisfied during operation at Hi level, and transitions to operation at Hi level if the temperature and humidity condition is satisfied during operation at Lo level.

The target temperature determination unit 53c determines the target evaporating temperature Te for each of the indoor heat exchanger 15 and the ventilator heat exchanger 18, based on level setting information and target temperature derivation information that are stored in the storage unit 55, and the temperature difference ΔT. That is, the target temperature determination unit 53c checks the temperature difference ΔT against target temperature derivation information corresponding to the evaporating temperature level of level setting information to thereby determine the corresponding target evaporating temperature Te for each of the indoor heat exchanger 15 and the ventilator heat exchanger 18. Then, the target temperature determination unit 53c outputs the determined target evaporating temperature Te to the air-conditioning control unit 54.

The air-conditioning control unit 54 controls the refrigerant circuit 200 such that the evaporating temperature of each of the indoor unit 1 and the ventilator 3 is equal to the target evaporating temperature Te adjusted by the target temperature adjustment unit 53. That is, the air-conditioning control unit 54 controls various actuators of the air-conditioning system 100 such that the evaporating temperature of every indoor heat exchanger 15 and the evaporating temperature of every ventilator heat exchanger 18 are equal to the target evaporating temperature Te determined by the target temperature determination unit 53c. For example, the air-conditioning control unit 54 can adjust the operating frequency of the compressor 11. The air-conditioning control unit 54 can also adjust the rotation speed of the outdoor fan 16. Further, the air-conditioning control unit 54 can adjust the opening degree of each of the first expansion valve 14a and the second expansion valve 14b. In addition, the air-conditioning control unit 54 can adjust the rotation speed of the indoor fan 17.

The control unit 51 can be implemented by hardware such as a circuit device that implements each of the above-mentioned functions, or can be implemented by, for example, software executed on a processing unit such as a microcomputer, a digital signal processor (DSP), or a central processing unit (CPU). The storage unit 55 can be implemented by a random access memory (RAM) and a read only memory (ROM), a programmable ROM (PROM) such as a flash memory, a hard disk drive (HDD), or other devices.

Figure 9:
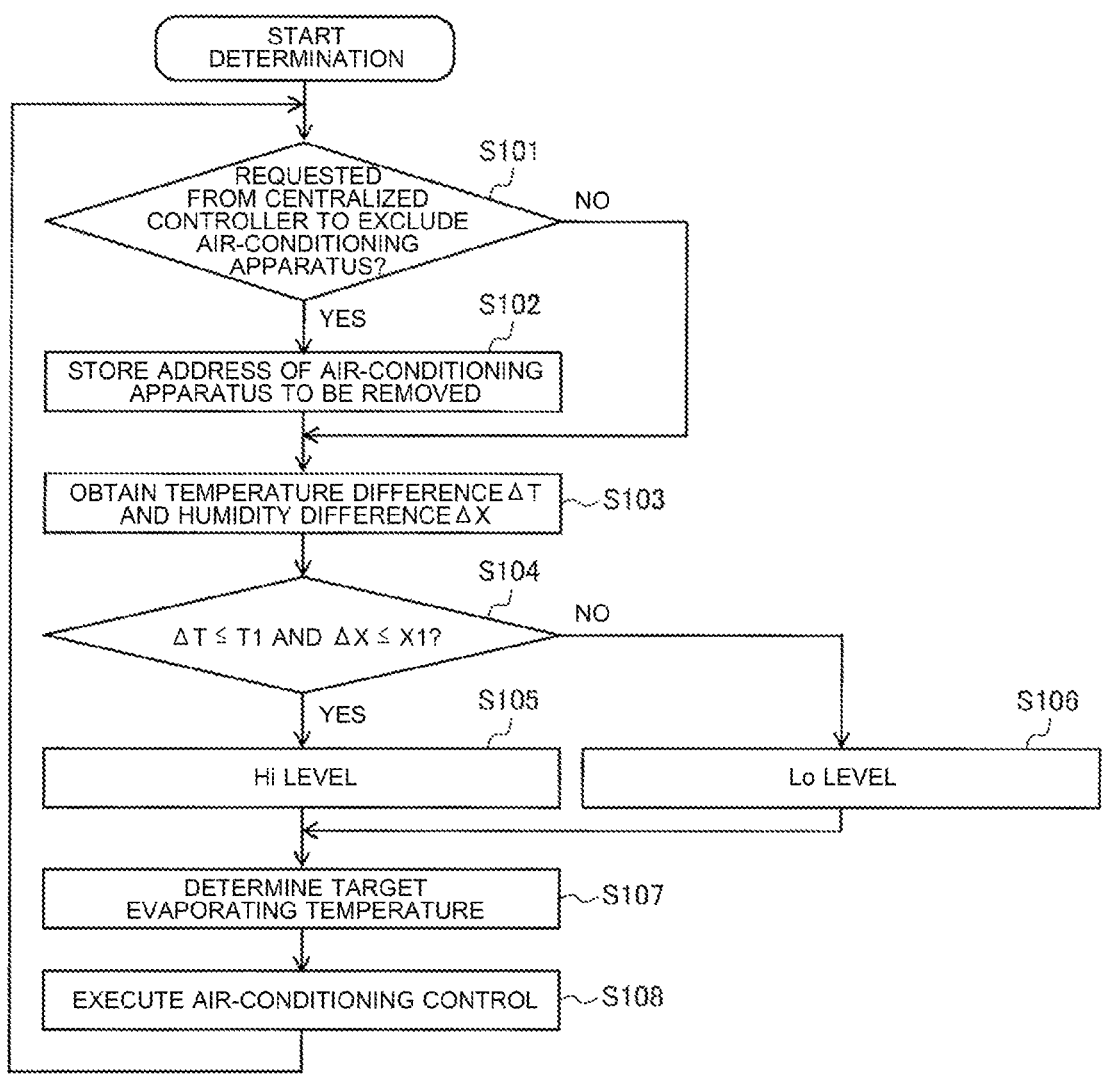
FIG. 9 is a flowchart illustrating operation of the air-conditioning system illustrated in FIG. 1.

FIG. 9 is a flowchart illustrating operation of the air-conditioning system illustrated in FIG. 1. With reference to FIG. 9, an air-conditioning method including an adjustment of the target evaporating temperature Te performed by the air-conditioning system 100 will be described below. The following describes operation for a case in which an air-conditioning apparatus to be excluded in performing an adjustment of the target evaporating temperature Te is selected in the centralized controller 20.

First, a user selects, via the input unit 21a of the centralized controller 20, an air-conditioning apparatus that the user considers to have a relatively small effect on comfort. Subsequently, the data processing unit 22b transmits the address of the selected air-conditioning apparatus to the control device 50. Then, the acquisition processing unit 52 recognizes that a request to exclude at least one air-conditioning apparatus has been made from the centralized controller 20 (step S101: YES), and stores, into the storage unit 55, the address of the air-conditioning apparatus to be excluded. At this time, the acquisition processing unit 52 excludes, from monitored-apparatus information, the address stored into the storage unit 55 (step S102).

Subsequently, based on the monitored-apparatus information updated by the acquisition processing unit 52, the difference calculation unit 53a identifies an air-conditioning apparatus from which the indoor temperature Ta and the indoor absolute humidity Xa are acquired. The difference calculation unit 53a then acquires the indoor temperature Ta and the indoor absolute humidity Xa from a temperature and humidity sensor provided to the identified air-conditioning apparatus. Then, the difference calculation unit 53a subtracts the indoor target temperature Ta_tgt from the acquired indoor temperature Ta to obtain the temperature difference ΔT. Further, the difference calculation unit 53a subtracts the indoor target absolute humidity Xa_tgt from the acquired indoor absolute humidity Xa to obtain the humidity difference ΔX (step S103).

If the user has not performed an operation of selecting an air-conditioning apparatus (step S101: NO), the difference calculation unit 53a identifies, based on the current monitored-apparatus information, an air-conditioning apparatus from which to acquire the indoor temperature Ta and the indoor absolute humidity Xa, and obtains the temperature difference ΔT and the humidity difference ΔX in the same manner as described above (step S103). In this regard, an air-conditioning apparatus whose address is included in the monitored-apparatus information at the time of transition to step S103 corresponds to an air-conditioning apparatus that satisfies a specific criterion.

Subsequently, the level determination unit 53b judges whether the temperature difference ΔT and the humidity difference ΔX satisfy the temperature and humidity condition that the temperature difference ΔT is less than or equal to the temperature threshold T1, and that the humidity difference ΔX is less than or equal to the humidity threshold X1 (step S104). If the temperature difference ΔT and the humidity difference ΔX satisfy the temperature and humidity condition (step S104: YES), the level determination unit 53b sets level setting information to Hi level (step S105). If the temperature difference ΔT and the humidity difference ΔX do not satisfy the temperature and humidity condition (step S104: NO), the level determination unit 53b sets level setting information to Lo level (step S106).

Subsequently, the target temperature determination unit 53c checks the temperature difference ΔT obtained by the difference calculation unit 53a against target temperature derivation information corresponding to the evaporating temperature level of level setting information to thereby determine the corresponding target evaporating temperature Te for each of the indoor heat exchanger 15 and the ventilator heat exchanger 18 (step S107). Then, the air-conditioning control unit 54 controls various actuators of the air-conditioning system 100 such that the evaporating temperature of each of the indoor heat exchanger 15 and the ventilator heat exchanger 18 is equal to the target evaporating temperature Te determined by the target temperature determination unit 53c (step S108).

The centralized controller 20 and the control device 50 repeatedly execute steps S101 to S108 mentioned above. For example, if the user has not performed an operation of selecting an air-conditioning apparatus (step S101: NO), the difference calculation unit 53a may obtain the temperature difference ΔT and the humidity difference ΔX after the elapse of a predetermined waiting time. The above-mentioned series of steps S104 to S108 corresponds to an adjustment of the target evaporating temperature Te.

As described above, with the air-conditioning system 100, the target evaporating temperature Te is adjusted based on a detection value detected by a temperature and humidity sensor provided to a temperature and humidity sensor of an air-conditioning apparatus that satisfies a specific criterion. Accordingly, a temperature and humidity sensor disposed in a place with low air-conditioning priority is not used. This allows for energy saving without deteriorating comfort. The control device 50 acquires specific criterion information corresponding to a specific criterion from the centralized controller 20, and identifies an air-conditioning apparatus that satisfies the specific criterion based on the acquired specific criterion information. This allows the control device 50 to adjust the target evaporating temperature Te in a flexible manner in cooperation with the centralized controller 20.

Further, the centralized controller 20 accepts a user's operation of selecting an air-conditioning apparatus with relatively low air-conditioning priority, and transmits the address of the selected air-conditioning apparatus to the control device 50 as specific criterion information. Then, the control device 50 identifies an air-conditioning apparatus that satisfies a specific criterion by using monitored-apparatus information from which the specific criterion information has been excluded. This makes it possible to adjust the target evaporating temperature Te in accordance with user's preferences.

The control device 50 acquires the temperature and humidity of indoor air from a temperature and humidity sensor provided to an air-conditioning apparatus that satisfies a specific criterion, and obtains the temperature difference ΔT between the acquired temperature and a target temperature and the humidity difference ΔX between the acquired humidity and a target humidity. If the temperature difference ΔT is less than or equal to the temperature threshold T1, and the humidity difference ΔX is less than or equal to the humidity threshold X1, the control device 50 determines the target evaporating temperature Te by using high target temperature derivation information. This helps increase situations in which evaporating temperature is increased, leading to improved energy saving.

(Alternative Configurations)

Although the foregoing description of Embodiment 1 is directed to an exemplary case in which the control device 50 updates monitored-apparatus information by using specific criterion information transmitted from the centralized controller 20, this is not to be construed to be restrictive. For example, the storage unit 55 may store, in advance, monitored-apparatus information from which the address of each air-conditioning apparatus not satisfying a specific criterion has been excluded, and the control device 50 may use this monitored-apparatus information in adjusting the target evaporating temperature Te.

In another exemplary configuration, a human presence sensor that detects the presence of a human body by means of infrared light, ultrasonic waves, or visible light may be disposed in the air-conditioned space S, and the control unit 22 of the centralized controller 20 may acquire detection information from the human presence sensor. In this case, based on detection information from the human presence sensor, the control unit 22 may desirably determine over time whether a human is present in the air-conditioning area of each air-conditioning apparatus. In this regard, the air-conditioning area of each air-conditioning apparatus refers to an area in the vicinity of each of multiple air-conditioning apparatuses. For example, the control unit 22 may, based on detection information from the human presence sensor, extract an area where no human has been present for a predetermined period of time or more, and transmit the address of an air-conditioning apparatus corresponding to the extracted area to the control device 50 as specific criterion information. In this case, the specific criterion information represents the address of an air-conditioning apparatus that does not satisfy a specific criterion. By automatically detecting an air-conditioning apparatus not satisfying a specific criterion in this way, it is possible to save the user the trouble of performing a selection operation. In this regard, it may be also possible for the control device 50 to acquire detection information from the human presence sensor, and determine over time whether a human is present in the air-conditioning area of each air-conditioning apparatus. That is, for example, the control device 50 may, based on detection information from the human presence sensor, extract an area where no human has been present for a predetermined period of time or more, and use, as specific criterion information, the address of an air-conditioning apparatus corresponding to the extracted area.

Further, although the foregoing description of Embodiment 1 is directed to an exemplary case in which the control device 50, which controls the refrigerant circuit 200 serving as a refrigerant system, is disposed in the outdoor unit 2, this is not to be construed to be restrictive. That is, the control device 50 may be disposed outside of the outdoor unit 2. For example, the control device 50 may be disposed in the indoor unit 1 or the ventilator 3. In this regard, if an indoor control device that controls various actuators within the indoor unit 1 is disposed in the indoor unit 1, it may be desirable for the control device 50 to control the first expansion valve 14a and the indoor fan 17 in cooperation with the indoor control device. Likewise, if a ventilation control device that controls various actuators within the ventilator 3 is disposed in the ventilator 3, it may be desirable for the control device 50 to control the second expansion valve 14b in cooperation with the ventilation control device.

Furthermore, although the foregoing description of Embodiment 1 is directed to an exemplary case in which the centralized controller 20 accepts the user's setting of an air-conditioning priority for each air-conditioning apparatus, and transmits specific criterion information to the control device 50, this is not to be construed to be restrictive. For example, the air-conditioning system 100 may include a remote control that is disposed in the air-conditioned space S for the purpose of operating an air-conditioning apparatus, and connected to the ventilator in a wired or wireless manner. The remote control may accept a user's operation of setting an air-conditioning priority for each air-conditioning apparatus, and transmit, to the control device 50, specific criterion information related to the air-conditioning priority of each air-conditioning apparatus. In this case, the remote control corresponds to "control apparatus" according to the present invention. The various alternative configurations mentioned above may also be employed for air-conditioning systems according to various embodiments described later.

Embodiment 2

An air-conditioning system according to Embodiment 2 performs an adjustment of the target evaporating temperature Te if every air-conditioning apparatus of the own system satisfies a comfort condition, which represents a condition on temperature difference and humidity difference for satisfying the minimum level of comfort. The air-conditioning system according to Embodiment 2 is otherwise similar in configuration to Embodiment 1 mentioned above, and thus identical or equivalent components will be designated by identical reference signs to avoid repetitive description.

In the presence of any air-conditioning apparatus in the air-conditioned space S that greatly deviates from the indoor target temperature Ta_tgt or the indoor target absolute humidity Xa_tgt, even if the air-conditioning apparatus has a relatively small effect on comfort, this may conceivably result in, for example, complaint for no cooling being provided during cooling operation. In Embodiment 1 described above, the temperature and humidity in the vicinity of an air-conditioning apparatus with low air-conditioning priority are not taken into account in adjusting the target evaporating temperature Te. This can particularly deteriorate comfort in the air-conditioning area of an air-conditioning apparatus with low air-conditioning priority.

Accordingly, the air-conditioning system 100 according to Embodiment 2 is configured such that, even in the presence of an air-conditioning apparatus not satisfying a specific criterion, if not every air-conditioning apparatus of the own system satisfies a comfort condition, a process of increasing evaporating temperature is not performed. The comfort condition in this case is that the temperature difference $\Delta T$ is less than a comfort temperature threshold T2, and that the humidity difference $\Delta X$ is less than a comfort humidity threshold X2. The comfort temperature threshold T2 and the comfort humidity threshold X2 serve as a reference for the minimum temperature and humidity to be observed by the indoor unit 1 and the ventilator 3. The comfort temperature threshold T2 is set greater than the temperature threshold T1, and the comfort humidity threshold X2 is set greater than the humidity threshold X1.

That is, the difference calculation unit 53a according to Embodiment 2 acquires the indoor temperature Ta and the indoor absolute humidity Xa from the temperature and humidity sensor of every air-conditioning apparatus of the own system. The difference calculation unit 53a also obtains the temperature difference $\Delta T$ and the humidity difference $\Delta X$ that correspond to every air-conditioning apparatus of the own system. Only if the temperature difference $\Delta T$ and the humidity difference $\Delta X$ that correspond to every air-conditioning apparatus of the own system satisfy the comfort condition, the difference calculation unit 53a determines, by using a detection value detected by a temperature and humidity sensor of an air-conditioning apparatus that satisfies a specific criterion, whether a temperature and humidity condition is satisfied. Embodiment 2 is otherwise similar in configuration in Embodiment 1.

The comfort temperature threshold T2 and the comfort humidity threshold X2 may be set in advance, or may be changed from the centralized controller 20. If a human presence sensor is provided in the air-conditioned space S, the control unit 22 of the centralized controller 20 may analyze population density in the air-conditioned space S based on detection information acquired from the human presence sensor. The control unit 22 may then automatically change the comfort temperature threshold T2 and the comfort humidity threshold X2 in response to an increase or decrease in population density in the air-conditioned space S.

Figure 10:
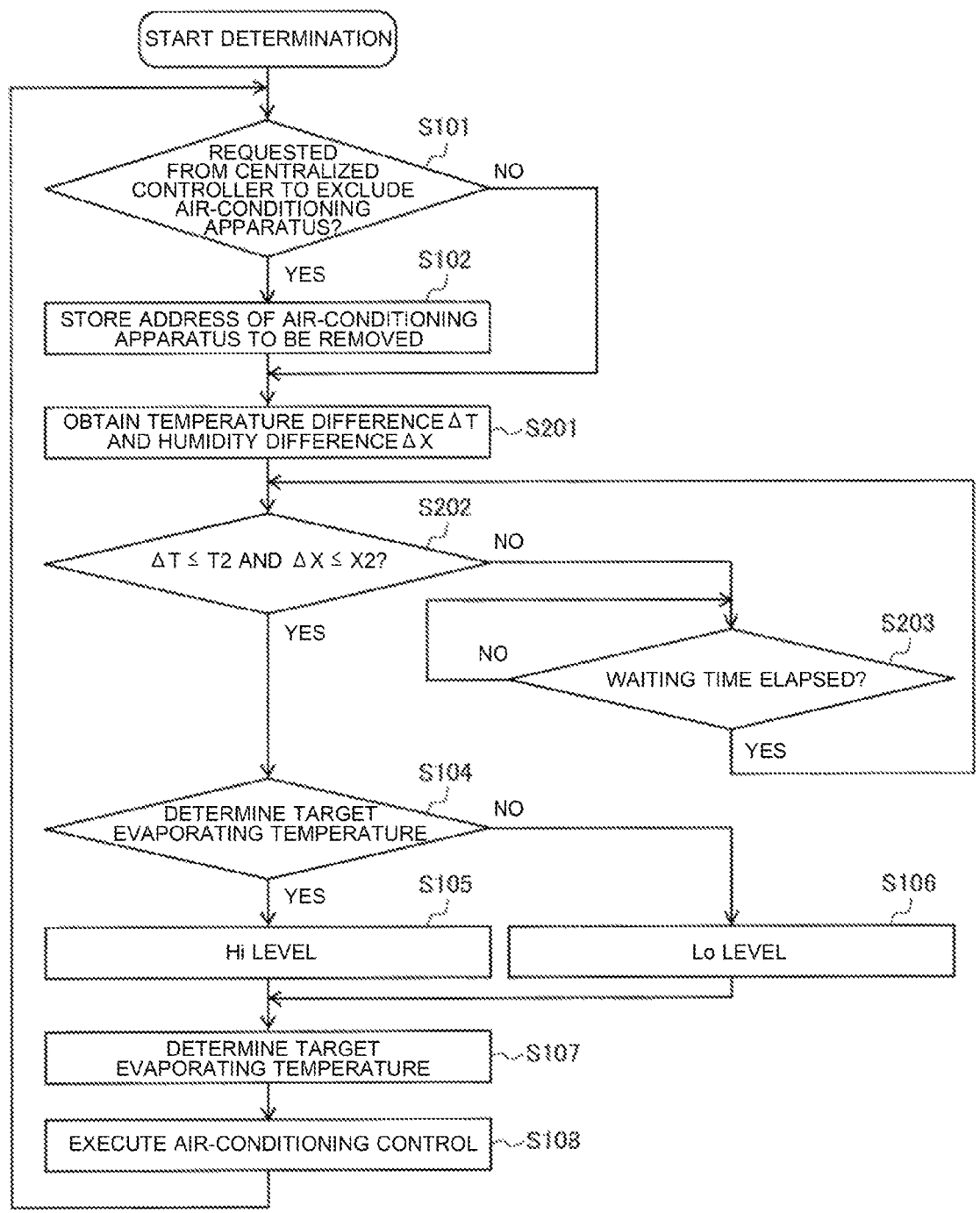
FIG. 10 is a flowchart illustrating operation of an air-conditioning system according to Embodiment 2 of the present invention.

FIG. 10 is a flowchart illustrating operation of the air-conditioning system according to Embodiment 2 of the present invention. With reference to FIG. 10, an air-conditioning method for the air-conditioning system 100 according to Embodiment 2 will be described. Steps similar to those of Embodiment 1 described above will be designated by identical reference signs as those in FIG. 9 to avoid repetitive description.

First, the air-conditioning system 100 executes steps S101 and S102 in a manner similar to that in FIG. 9. Subsequently, the difference calculation unit 53a acquires the indoor temperature Ta and the indoor absolute humidity Xa from the temperature and humidity sensor of every air-conditioning apparatus of the own system. The difference calculation unit 53a then obtains the temperature difference $\Delta T$ and the humidity difference $\Delta X$ that correspond to every air-conditioning apparatus of the own system (step S201).

Subsequently, the difference calculation unit 53a determines whether the temperature difference $\Delta T$ and the humidity difference $\Delta X$ that correspond to every air-conditioning apparatus of the own system satisfy the comfort condition that the temperature difference $\Delta T$ is less than the comfort temperature threshold T2 and that the humidity difference $\Delta X$ is less than the comfort humidity threshold X2 (step S202). If the temperature difference $\Delta T$ and the humidity difference $\Delta X$ that correspond to every air-conditioning apparatus of the own system satisfy the comfort condition (step S202: YES), the difference calculation unit 53a proceeds to step S104. The air-conditioning system 100 then executes the series of steps from S104 to S108 in a manner similar to that in FIG. 9.

If there is even a single air-conditioning apparatus that does not satisfy the comfort condition among the air-conditioning apparatuses of the own system (step S202: NO), the difference calculation unit 53a waits until a preset waiting time elapses (step S203: NO). Upon elapse of the waiting time, the process returns to step S202.

As described above, the air-conditioning system 100 according to Embodiment 2 does not perform a process of increasing evaporating temperature even if an air-conditioning apparatus with low air-conditioning priority is selected in the centralized controller 20, unless every air-conditioning apparatus of the own system satisfies a comfort condition. That is, the control device 50 according to Embodiment 2 does not perform an adjustment of the target evaporating temperature Te even when specific criterion information is transmitted from the centralized controller 20, unless every air-conditioning apparatus of the own system satisfies a comfort condition. This helps avoid situations in which comfort is deteriorated, such as no cooling being provided during cooling operation.

The air-conditioning system 100 according to Embodiment 2 adjusts the target evaporating temperature Te based on a detection value detected by a temperature and humidity sensor of an air-conditioning apparatus that satisfies a specific criterion, if every air-conditioning apparatus of the own system satisfies a comfort condition. This helps avoid insufficient cooling, insufficient dehumidification, or other such situations to ensure the minimum level of comfort. Further, the ability to increase evaporating temperature in appropriate situations allows for improved energy saving. Other effects and alternative configurations are similar to those of Embodiment 1.

Embodiment 3

Figure 11:
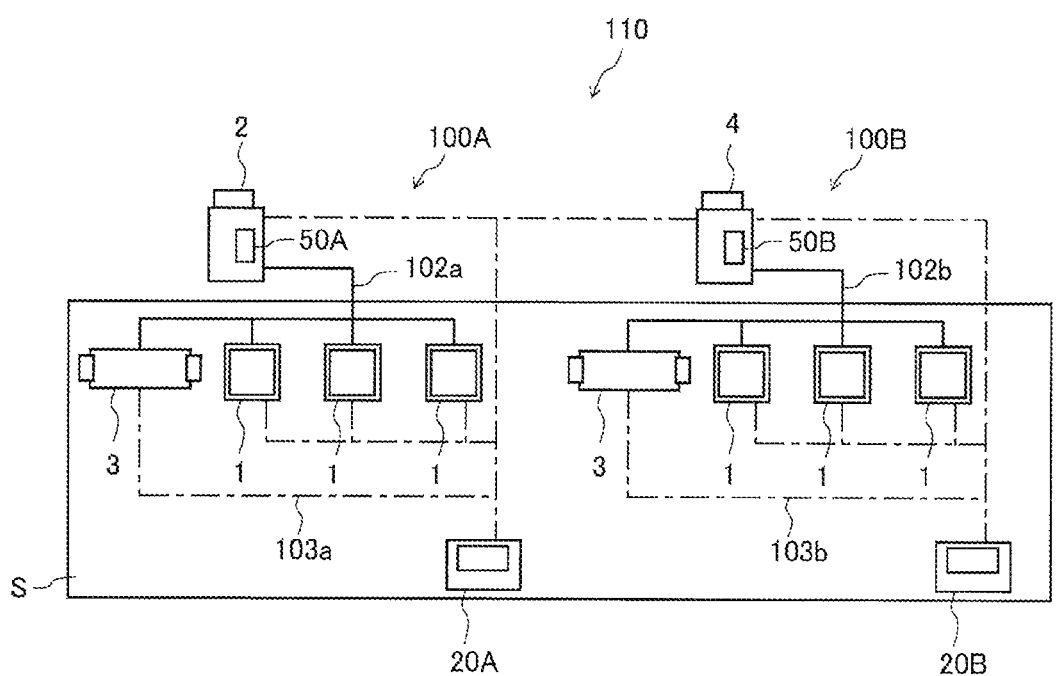
FIG. 11 schematically illustrates an air-conditioning system according to Embodiment 3 of the present invention.

FIG. 11 schematically illustrates an air-conditioning system according to Embodiment 3 of the present invention. As illustrated in FIG. 11, an air-conditioning system 110 according to Embodiment 3 includes a first air-conditioning system 100A, and a second air-conditioning system 100B. The first air-conditioning system 100A and the second air-conditioning system 100B are configured to be capable of communicating with each other. The first air-conditioning system 100A and the second air-conditioning system 100B are each similar in configuration to the air-conditioning system 100 according to Embodiment 1 or 2 described above, and thus identical or equivalent components will be designated by identical reference signs to avoid repetitive description. Although centralized controllers 20A and 20B are similar in configuration to the centralized controller 20 according to Embodiment 1 or 2, for the convenience of explanation, a suffix is attached to each of these components for differentiation. Although control devices 50A and 50B are similar in configuration to the control device 50 according to Embodiment 1 or 2, for the convenience of explanation, a suffix is attached to each of these components for differentiation.

Since the first air-conditioning system 100A and the second air-conditioning system 100B are similar in configuration to each other as described above, the following description will mainly focus on the configuration and operation of the first air-conditioning system 100A. As viewed from the first air-conditioning system 100A, the refrigerant circuit 200 of the first air-conditioning system 100A itself is a refrigerant circuit of the own system, and the refrigerant circuit 200 of the second air-conditioning system 100B is a refrigerant circuit of another system.

The centralized controller 20A accepts a user's operation of selecting an air-conditioning apparatus of another system. Accordingly, if every ventilator 3 of the own system is installed in a place with low air-conditioning priority, and if the ventilator 3 of the other system is installed in a place with high air-conditioning priority, the user can perform, via the input unit 21a, a selection operation to exclude the ventilator 3 of the own system and add the ventilator 3 of the other system. In this case, the data processing unit 22b transmits the following pieces of information to the control device 50A as specific criterion information: the address of the ventilator 3 of the own system selected as the ventilator 3 to be excluded; and the address of the ventilator 3 of the other system selected as the ventilator 3 to be added. Based on the specific criterion information, the acquisition processing unit 52 of the control device 50A excludes the address of the ventilator 3 of the own system from monitored-apparatus information, and adds the ventilator 3 of the other system to the monitored-apparatus information. Then, based on the monitored-apparatus information, the difference calculation unit 53a uses, as the indoor absolute humidity Xa, the absolute humidity of indoor air detected by the RA temperature and humidity detection unit 32 of the ventilator 3 of the other system. The ventilator 3 of the other system corresponds to "another ventilator" according to the present invention.

If every indoor unit 1 of the own system is installed in a place with low air-conditioning priority, and if the indoor unit 1 of another system is installed in a place with high air-conditioning priority, the user can perform, via the input unit 21a, a selection operation to exclude the indoor unit 1 of the own system and add the indoor unit 1 of the other system. In this case, the data processing unit 22b transmits the following pieces of information to the control device 50A as specific criterion information: the address of the indoor unit 1 of the own system selected as the indoor unit 1 to be excluded; and the address of the indoor unit 1 of the other system selected as the indoor unit 1 to be added. Based on the specific criterion information, the acquisition processing unit 52 of the control device 50A excludes the address of the indoor unit 1 of the own system from monitored-apparatus information, and adds the indoor unit 1 of the other system to the monitored-apparatus information. Then, based on the monitored-apparatus information, the difference calculation unit 53a uses, as the indoor temperature Ta, the suction temperature detected by the suction temperature and humidity detection unit 43 of the other system. Embodiment 3 is otherwise similar in configuration in Embodiment 1.

Figure 12:
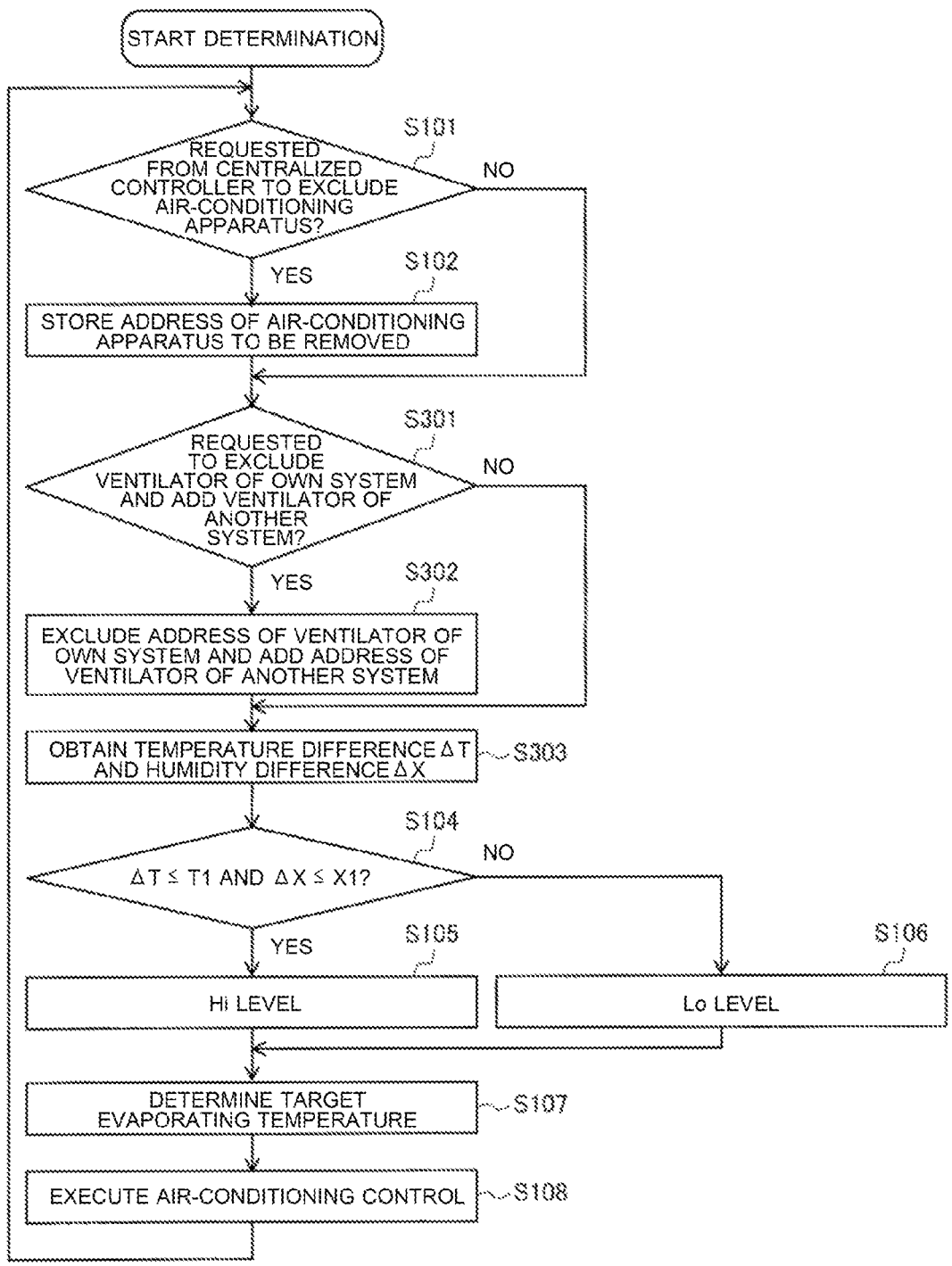
FIG. 12 is a flowchart illustrating operation of the air-conditioning system illustrated in FIG. 11.

FIG. 12 is a flowchart illustrating operation of the air-conditioning system illustrated in FIG. 11. With reference to FIG. 12, an air-conditioning method for the air-conditioning system 110 according to Embodiment 3 will be described. Steps similar to those of Embodiment 1 described above will be designated by identical reference signs as those in FIG. 9 to avoid repetitive description. The following description will be directed to a case in which every ventilator 3 of the own system is installed in a place with low air-conditioning priority, and the ventilator 3 of another system is installed in a place with high air-conditioning priority.

A user performs, via the input unit 21a of the centralized controller 20A, a selection operation to exclude every ventilator 3 of the own system and add the ventilator 3 of another system. Then, the data processing unit 22b transmits, to the control device 50A, the address of the ventilator 3 of the own system selected as the ventilator 3 to be excluded, and the address of the ventilator 3 of the other system selected as the ventilator 3 to be added. The acquisition processing unit 52 of the control device 50A recognizes that there has been a request to exclude the ventilator 3 of the own system and add the ventilator 3 of the other system (step S301: YES), and stores, into the storage unit 55, the address of the ventilator 3 of the own system and the address of the ventilator 3 of the other system. At this time, the acquisition processing unit 52 excludes the address of the ventilator 3 of the own system from monitored-apparatus information, and adds the ventilator 3 of the other system to the monitored-apparatus information (step S302).

Subsequently, based on the monitored-apparatus information updated by the acquisition processing unit 52, the difference calculation unit 53a identifies an air-conditioning apparatus from which to acquire the indoor temperature Ta and the indoor absolute humidity Xa. Then, through communication with the control device 50B or the centralized controller 20B, the difference calculation unit 53a acquires the indoor absolute humidity Xa from the temperature and humidity sensor of the ventilator 3 of the other system added to the monitored-apparatus information. The difference calculation unit 53a also acquires the indoor temperature Ta from the temperature and humidity sensor of the indoor unit 1 of the own system. Then, the difference calculation unit 53a subtracts the indoor target temperature Ta_tgt from the acquired indoor temperature Ta to obtain the temperature difference $\Delta T$. Further, the difference calculation unit 53a subtracts the indoor target absolute humidity Xa_tgt from the acquired indoor absolute humidity Xa to obtain the humidity difference $\Delta X$ (step S303).

If the user has not performed a selection operation to exclude every ventilator 3 of the own system and add the ventilator 3 of the other system (step S301: NO), the difference calculation unit 53a identifies, based on the current monitored-apparatus information, an air-conditioning apparatus from which the indoor temperature Ta and the indoor absolute humidity Xa are acquired, and obtains the temperature difference $\Delta T$ and the humidity difference $\Delta X$ (step S303). In this regard, an air-conditioning apparatus whose address is included in the monitored-apparatus information at the time of transition to step S303 corresponds to an air-conditioning apparatus that satisfies a specific criterion.

The first air-conditioning system 100A then executes the series of steps from S104 to S108 in a manner similar to that in FIG. 9. The first air-conditioning system 100A may perform, in addition to the series of steps S301 to S303 and steps S104 to S108 mentioned above, the series of steps S201 to S203 according to Embodiment 2 illustrated in FIG. 11.

As described above, the air-conditioning system 110 according to Embodiment 3 makes it possible to accept, from the centralized controller 20A or 20B, a selection operation to exclude an air-conditioning apparatus with low air-conditioning priority that belongs to the own system and add an air-conditioning apparatus with high air-conditioning priority that belongs to another system. Then, the centralized controller 20A or 20B transmits, to the control device 50A or 50B, the address of the air-conditioning apparatus to be excluded and the address of the air-conditioning apparatus to be added. Accordingly, the control device 50A or 50B can acquire the indoor temperature Ta or the indoor absolute humidity Xa not only from the temperature and humidity sensor of the air-conditioning apparatus of the own system but also from the air-conditioning apparatus of the other system. As a result, the temperature difference $\Delta T$ and the humidity difference $\Delta X$ can be obtained by using more accurate values of the indoor temperature Ta and the indoor absolute humidity Xa in performing an adjustment of the target evaporating temperature Te. This helps increase situations in which evaporating temperature is increased, leading to improved energy saving. Other effects and alternative configurations are similar to those of Embodiments 1 and 2.

The foregoing description is directed to an exemplary case in which every ventilator 3 of the first air-conditioning system 100A or the second air-conditioning system 100B is set in a place with low air-conditioning priority. In this regard, the first air-conditioning system 100A or the second air-conditioning system 100B may have no ventilator 3. In this case, for example, when the user performs, via the input unit 21a of the centralized controller 20A, a selection operation to add the ventilator 3 of another system, the data processing unit 22b transmits the address of the ventilator 3 of the other system to the control device 50A or 50B. Then, the acquisition processing unit 52 of the control device 50A or 50B adds the address of the ventilator 3 of the other system to monitored-apparatus information.

Embodiment 4

Figure 13:
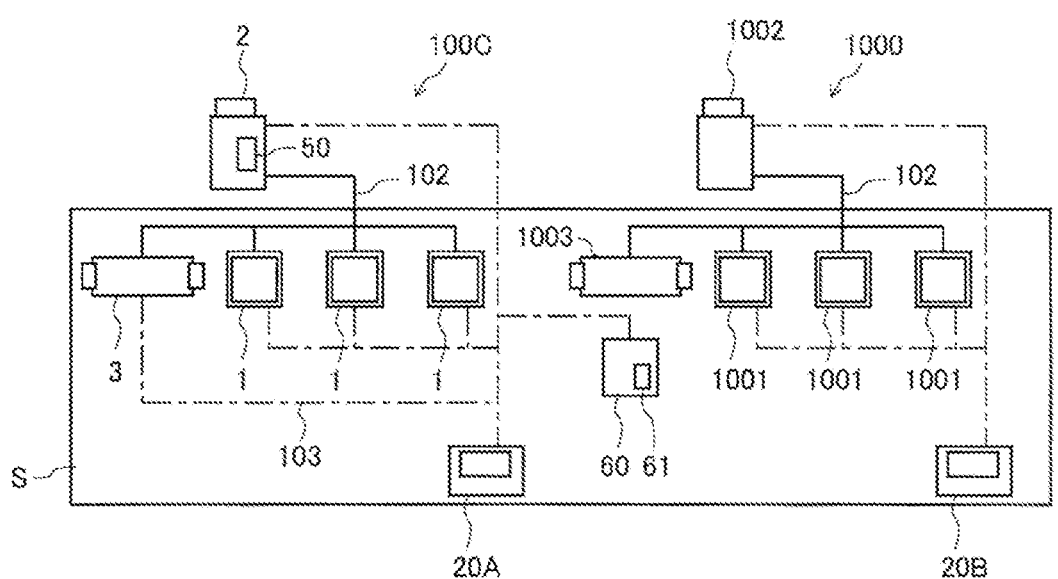
FIG. 13 schematically illustrates an air-conditioning system according to Embodiment 4 of the present invention.

FIG. 13 schematically illustrates an air-conditioning system according to Embodiment 4 of the present invention. As illustrated in FIG. 11, an air-conditioning system 100C according to Embodiment 4 includes a communication device 60. An air-conditioning system 1000 is disposed in the air-conditioned space S. The manufacturer of the air-conditioning system 1000 is different from the manufacturer of the air-conditioning system 100C, for example. As such, the air-conditioning system 100C and the air-conditioning system 1000 are not capable of communicating with each other.

The air-conditioning system 100C is similar in configuration to the air-conditioning system 100 according to each of Embodiments 1 and 2 mentioned above, and thus identical or equivalent components will be designated by identical reference signs to avoid repetitive description. The air-conditioning system 1000 is a general air-conditioning system including an indoor unit 1001, an outdoor unit 1002, and a ventilator 1003. The ventilator 1003 is assumed to be installed in a place with high air-conditioning priority.

The communication device 60 is capable of communicating with the centralized controller 20 and the control device 50 in a wired or wireless manner. It is assumed that the communication device 60 is disposed in a place near the ventilator 1003 and with high air-conditioning priority. A conceivable example of the communication device 60 is a remote control used for operating an air-conditioning apparatus. As illustrated in FIG. 13, the communication device 60 includes a humidity sensor 61 to detect the absolute humidity of air in the air-conditioned space S. The centralized controller 20 acquires the address of the communication device 60, and stores the address into the storage unit 23. The control device 50 can acquire a detection value detected by the humidity sensor 61. The control device 50 can use, as the indoor absolute humidity Xa, a detection value detected by the humidity sensor 61. A target temperature and a target absolute humidity are set in the communication device 60. The control device 50 may acquire a target temperature and a target absolute humidity either directly from the communication device 60 or via the centralized controller 20.

The centralized controller 20 accepts a user's operation of selecting the communication device 60. Accordingly, if every ventilator 3 of the own system is installed in a place with low air-conditioning priority, the user can perform, via the input unit 21a, a selection operation to exclude the ventilator 3 of the own system and add the communication device 60. In this case, the data processing unit 22b transmits, as specific criterion information, the address of the ventilator 3 of the own system and the address of the communication device 60 to the control device 50. Thus, based on the specific criterion information, the acquisition processing unit 52 of the control device 50 excludes the address of the ventilator 3 of the own system from monitored-apparatus information, and adds the address of the communication device 60 to the monitored-apparatus information. Then, the difference calculation unit 53a references the monitored-apparatus information, and uses, as the indoor absolute humidity Xa, the absolute humidity of indoor air detected by the humidity sensor 61 of the communication device 60. Embodiment 4 is otherwise similar in configuration to Embodiments 1 and 2.

Figure 14:
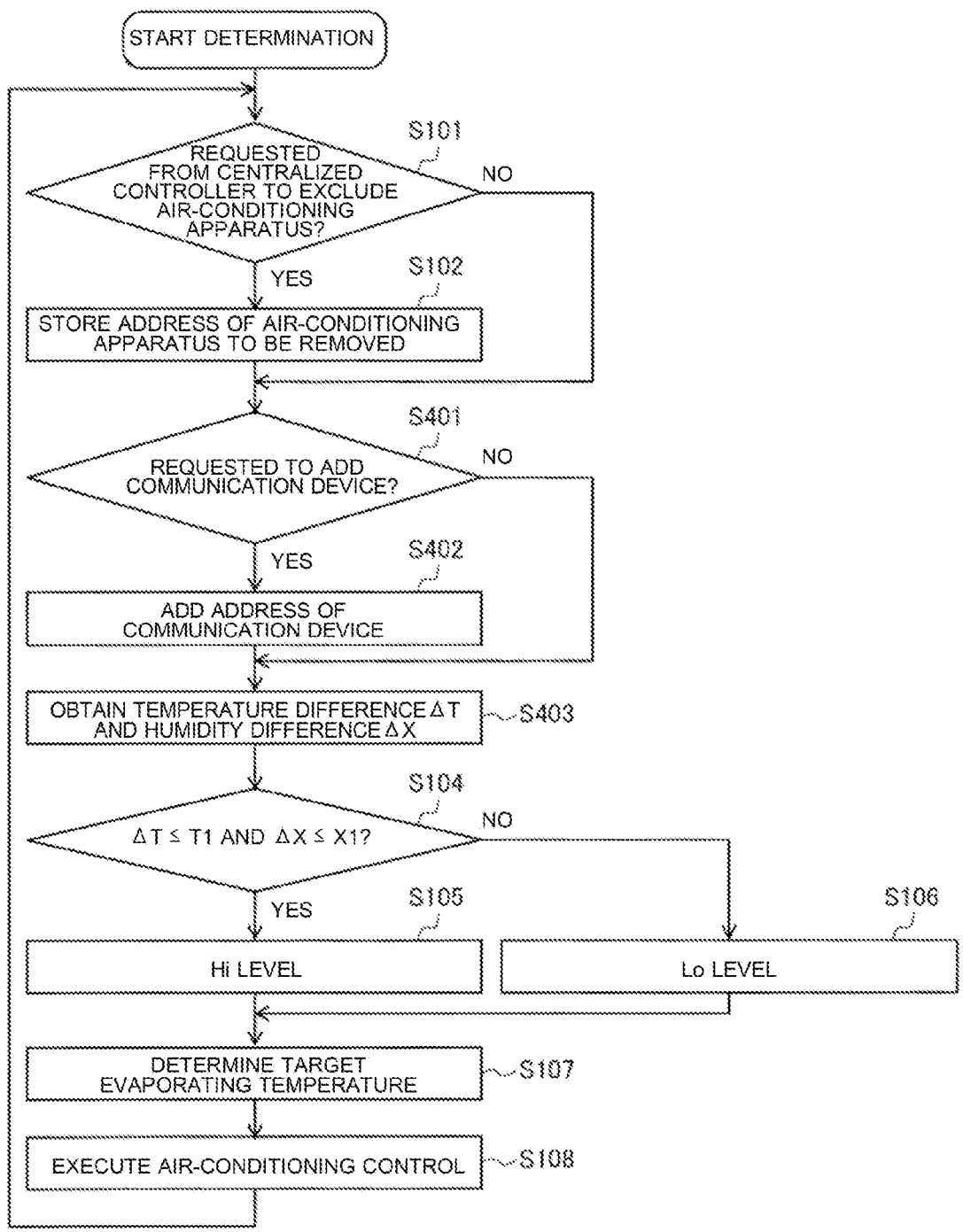
FIG. 14 is a flowchart illustrating operation of the air-conditioning system illustrated in FIG. 13.

FIG. 14 is a flowchart illustrating operation of the air-conditioning system illustrated in FIG. 13. With reference to FIG. 14, an air-conditioning method for the air-conditioning system 100C according to Embodiment 4 will be described.

Steps similar to those of Embodiment 1 described above will be designated by identical reference signs as those in FIG. 9 to avoid repetitive description.

A user performs, via the input unit 21a of the centralized controller 20A, a selection operation to exclude every ventilator 3 of the own system and add the communication device 60. Then, the data processing unit 22b transmits the address of the ventilator 3 and the address of the communication device 60 to the control device 50. The acquisition processing unit 52 of the control device 50 recognizes that there has been a request to exclude the ventilator 3 of the own system and add the communication device 60 (step S401: YES), and stores the address of the ventilator 3 of the own system and the address of the communication device 60 into the storage unit 55. At this time, the acquisition processing unit 52 excludes the address of the ventilator 3 of the own system from monitored-apparatus information, and adds the address of the communication device 60 to the monitored-apparatus information (step S402).

Subsequently, based on the monitored-apparatus information updated by the acquisition processing unit 52, the difference calculation unit 53a identifies an air-conditioning apparatus from which to acquire the indoor temperature Ta and the indoor absolute humidity Xa. Then, the difference calculation unit 53a acquires the indoor absolute humidity Xa from the humidity sensor 61 of the communication device 60. The difference calculation unit 53a also acquires the indoor temperature Ta from the temperature and humidity sensor of the indoor unit 1 of the own system. Then, the difference calculation unit 53a subtracts the indoor target temperature Ta_tgt from the acquired indoor temperature Ta to obtain the temperature difference ΔT. Further, the difference calculation unit 53a subtracts the indoor target absolute humidity Xa_tgt from the acquired indoor absolute humidity Xa to obtain the humidity difference ΔX (step S403).

If the user has not performed a selection operation to exclude every ventilator 3 of the own system and add the communication device 60 (step S401: NO), the difference calculation unit 53a acquires the indoor temperature Ta and the indoor absolute humidity Xa based on the current monitored-apparatus information, and obtains the temperature difference ΔT and the humidity difference ΔX (step S403). In this regard, an air-conditioning apparatus whose address is included in the monitored-apparatus information at the time of transition to step S403 corresponds to an air-conditioning apparatus that satisfies a specific criterion.

The air-conditioning system 100C then executes the series of steps from S104 to S108 in a manner similar to that in FIG. 9. The air-conditioning system 100C may perform, in addition to the series of steps S401 to S403 and steps S104 to S108 mentioned above, the series of steps S201 to S203 according to Embodiment 2 illustrated in FIG. 11.

As described above, with the air-conditioning system 100C according to Embodiment 4, the communication device 60 having the humidity sensor 61 is installed in a place with high air-conditioning priority, and the control device 50 is capable of acquiring the absolute humidity of indoor air from the humidity sensor 61. The centralized controller 20 accepts a selection operation to exclude the ventilator 3 with low air-conditioning priority that belongs to the own system and add the communication device 60, and also transmits the address of the ventilator 3 of the own system and the address of the communication device 60 to the control device 50. The control device 50 is thus able to acquire the indoor absolute humidity Xa from the humidity sensor 61 of the communication device 60. Accordingly, in performing an adjustment of the target evaporating temperature Te, the humidity difference ΔX can be obtained by using a more accurate value of the indoor absolute humidity Xa. This helps increase situations in which evaporating temperature is increased, leading to further energy saving. Other effects and alternative configurations are similar to those of Embodiments 1 and 2.

Embodiment 5

Figure 15:
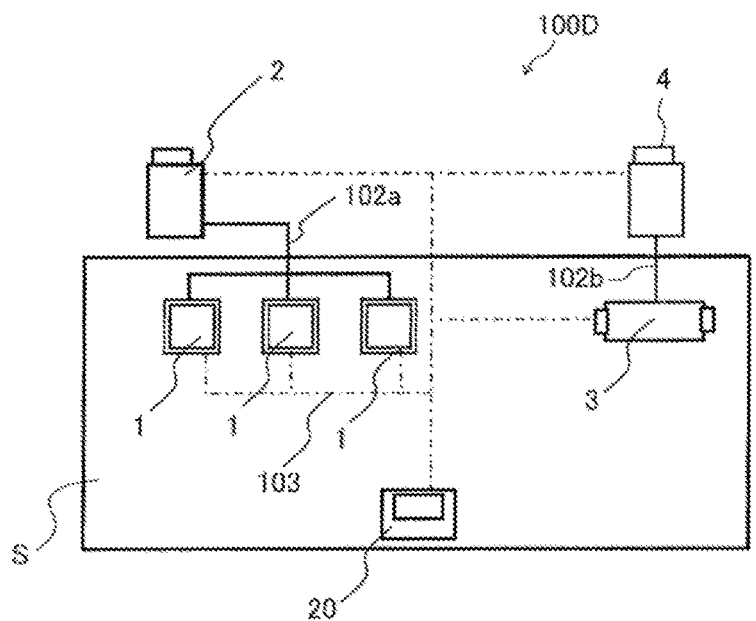
FIG. 15 schematically illustrates an exemplary air-conditioning system according to Embodiment 5 of the present invention.
Figure 16:
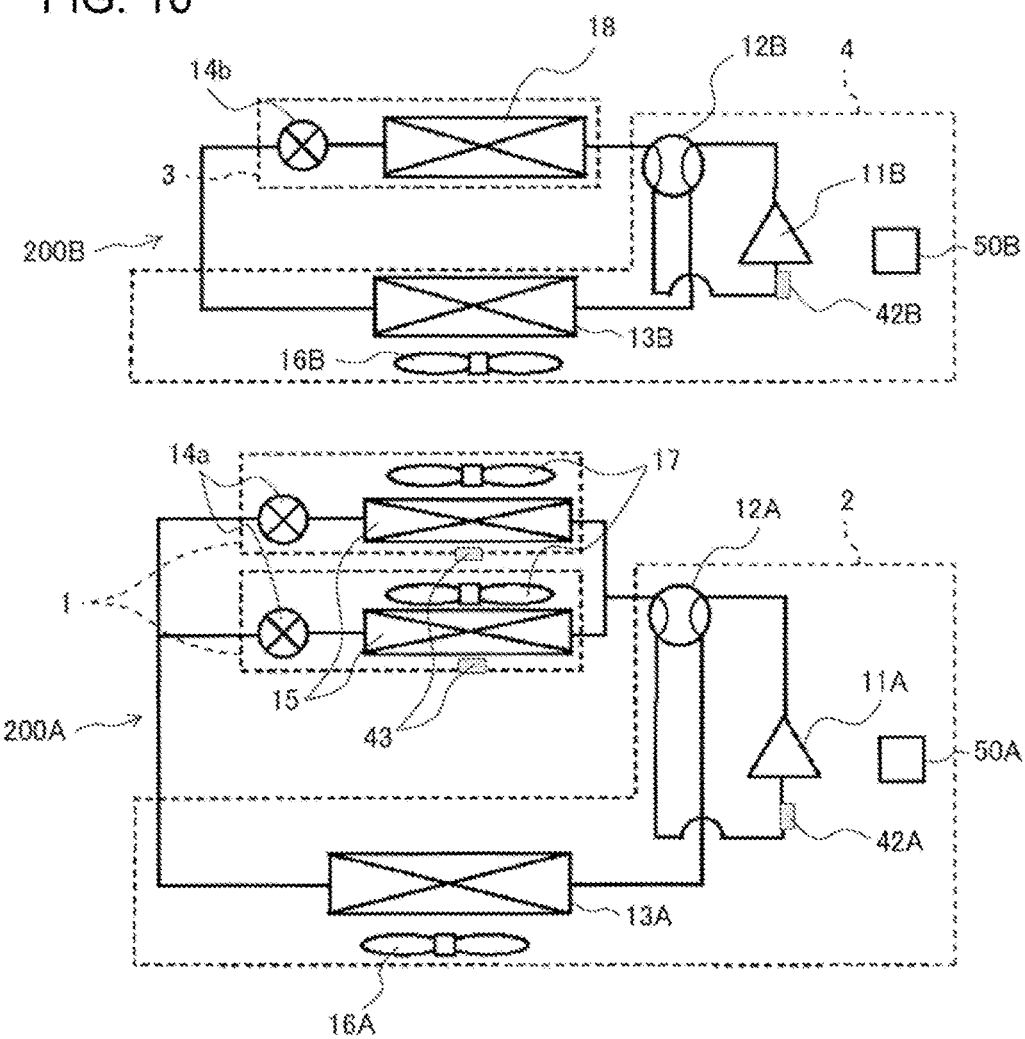
FIG. 16 is a refrigerant circuit diagram including the control system of the air-conditioning system illustrated in FIG. 15.
Figure 17:
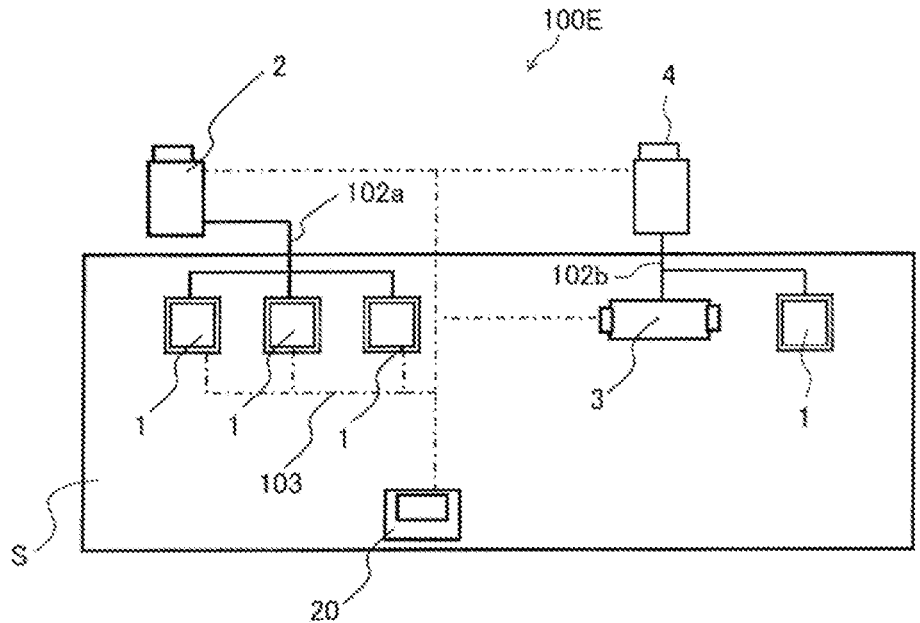
FIG. 17 schematically illustrates another exemplary air-conditioning system according to Embodiment 5 of the present invention.

FIG. 15 schematically illustrates an exemplary air-conditioning system according to Embodiment 5 of the present invention. FIG. 16 is a refrigerant circuit diagram including the control system of the air-conditioning system illustrated in FIG. 15. FIG. 17 schematically illustrates another exemplary air-conditioning system according to Embodiment 5 of the present invention. As illustrated in FIGS. 15 to 17, air-conditioning systems 100D and 100E according to Embodiment 5 are characterized by including two refrigerant systems. Components identical or equivalent to those of the air-conditioning system 100 according to each of Embodiments 1 and 2 mentioned above will be designated by identical reference signs or names to avoid repetitive description.

The air-conditioning system 100D has a refrigerant circuit 200A, which is one refrigerant system including the outdoor unit 2 and one or more indoor units 1. The air-conditioning system 100D also has a refrigerant circuit 200B, which is the other refrigerant system including an outdoor unit 4 and one or more ventilators 3. FIGS. 15 and 16 each illustrate an exemplary case in which the refrigerant circuit 200A includes three indoor units 1. FIGS. 15 and 16 each illustrate an exemplary case in which the refrigerant circuit 200B includes a single ventilator 3. In the following description, one refrigerant system corresponding to the refrigerant circuit 200A will be referred to as "first refrigerant system", and the other refrigerant system corresponding to the refrigerant circuit 200B will be referred to as "second refrigerant system".

The outdoor unit 2 and the indoor unit 1 are connected by a refrigerant pipe 102a. The outdoor unit 4 and the ventilator 3 are connected by a refrigerant pipe 102b. The indoor unit 1, the outdoor unit 2, the ventilator 3, and the outdoor unit 4 are each connected to the centralized controller 20 via the transmission line 103. Alternatively, however, the centralized controller 20 may communicate with each of the indoor unit 1, the outdoor unit 2, the ventilator 3, and the outdoor unit 4 in a wireless manner.

The refrigerant circuit 200A includes a compressor 11A, a four-way valve 12A, an outdoor heat exchanger 13A, the first expansion valve 14a, and the indoor heat exchanger 15. The refrigerant circuit 200B includes a compressor 11B, a four-way valve 12B, an outdoor heat exchanger 13B, the second expansion valve 14b, and the ventilator heat exchanger 18. The outdoor unit 2 includes an outdoor fan 16A disposed beside the outdoor heat exchanger 13A. The outdoor unit 2 includes the control device 50A that controls the refrigerant circuit 200A and the outdoor fan 16A. The outdoor unit 4 includes an outdoor fan 16B disposed beside the outdoor heat exchanger 13B. The outdoor unit 4 includes the control device 50B that controls the refrigerant circuit 200B and the outdoor fan 16B. The control device 50A and the control device 50B are each similar in configuration to the control device 50 according to each of Embodiments 1 to 4 mentioned above. The control device 50A and the control device 50B can control the air-conditioning system 100D in corporation with each other.

The air-conditioning system 100E is similar in configuration to the air-conditioning system 100D but is different from the air-conditioning system 100D in that the refrigerant circuit 200B includes one or more indoor units 1. FIG. 17 illustrates an exemplary case in which the refrigerant circuit 200B includes a single ventilator 3 and a single indoor unit 1. The refrigerant circuit diagram of the air-conditioning system 100E is similar to that in FIG. 16 and thus not illustrated.

The centralized controller 20 can perform an adjustment of the target evaporating temperature Te in cooperation with each of the control device 50A and the control device 50B. In Embodiment 5, if, for example, every air-conditioning apparatus connected to the refrigerant circuit 200B is the ventilator 3 as in the air-conditioning system 100D, the control device 50B performs an adjustment of the target evaporating temperature Te by using only a detection value detected by the RA temperature and humidity detector 32 of the ventilator 3. Further, even if air-conditioning apparatuses connected to the refrigerant circuit 200B include the indoor unit 1 as in the air-conditioning system 100E, when a user performs a selection operation to exclude every indoor unit 1 of the refrigerant circuit 200B, the control device 50B performs an adjustment of the target evaporating temperature Te by using only a detection value detected by the RA temperature and humidity detector 32 of the ventilator 3.

Figure 18:
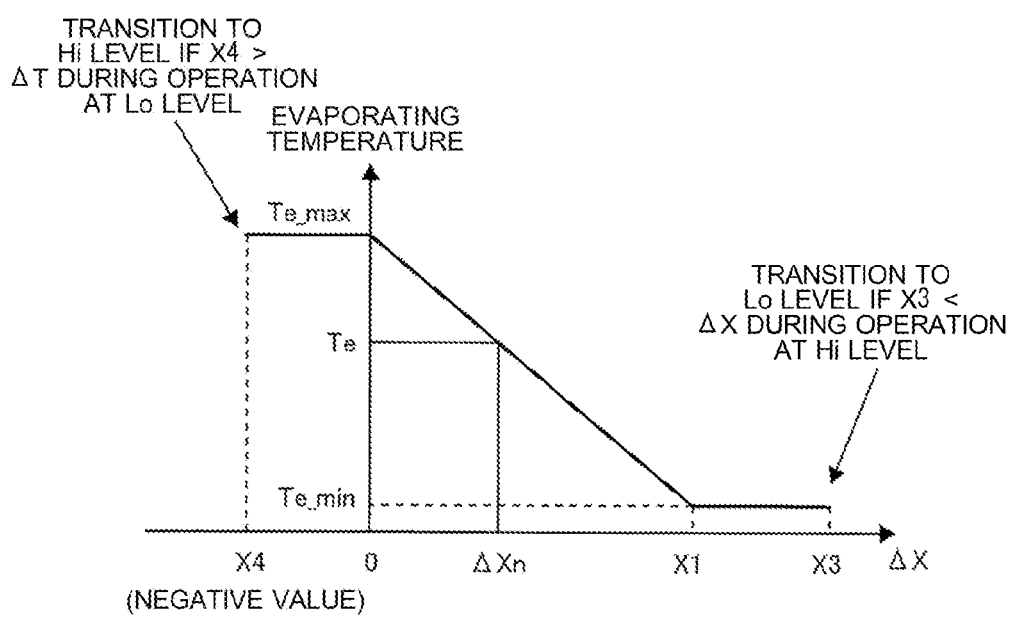
FIG. 18 is a graph illustrating target temperature derivation information used to obtain a target evaporating temperature for each of an indoor heat exchanger and a ventilator cooler that are illustrated in FIG. 16.

FIG. 18 is a graph illustrating target temperature derivation information used to obtain a target evaporating temperature for each of the indoor heat exchanger and the ventilator cooler that are illustrated in FIG. 16. The storage unit 55 of the control device 50B stores target temperature derivation information as illustrated in FIG. 18. In FIG. 18, the vertical axis represents the evaporating temperature of the indoor heat exchanger 15 or the ventilator heat exchanger 18, and the horizontal axis represents humidity difference $\Delta X$. A humidity difference $\Delta Xn$ is an exemplary value obtained by subtracting the indoor target absolute humidity $Xa\_tgt$ from the current indoor absolute humidity $Xa$. That is, as illustrated in FIG. 18, the target temperature derivation information associates the humidity difference $\Delta X$ with the target evaporating temperature Te. By checking the humidity difference $\Delta Xn$ against the target temperature derivation information, the corresponding target evaporating temperature Te can be obtained. Te_max represents maximum evaporating temperature, which is the maximum value of target evaporating temperature Te. Te_min represents minimum evaporating temperature, which is the minimum value of target evaporating temperature Te. Further, FIG. 18 illustrates a humidity threshold X3, which is set higher than the humidity threshold X1, and a humidity threshold X4, which is set lower than zero.

For the target temperature derivation information, with the humidity difference $\Delta X$ in the range "$0<\Delta X<X1$", there is a proportional relationship between the humidity difference $\Delta X$ and the target evaporating temperature Te such that the target evaporating temperature Te decreases with increasing humidity difference $\Delta X$. Further, for the target temperature derivation information, when the humidity difference $\Delta X$ is less than or equal to zero, the target evaporating temperature Te is set to the maximum evaporating temperature ET_max, and when the humidity difference $\Delta X$ is greater than or equal to X1, the target evaporating temperature Te is set to the minimum evaporating temperature ET_min.

As with the table of FIG. 8, for the maximum evaporating temperature Te_max and the minimum evaporating temperature Te_min, plural patterns of values are stored for each evaporating temperature level. In Embodiment 5 as well, as evaporating temperature level, the following two patterns of values are set: Hi level with relatively high evaporating temperature, and Lo level with relatively low evaporating temperature.

If the humidity difference $\Delta X$ becomes greater than the humidity threshold X3 during operation of the refrigerant circuit 200B at Hi level, it can be determined that the latent heat load has not been handled successfully due to insufficient dehumidification capacity. Accordingly, to increase dehumidification capacity, the control device 50B may transition from Hi level to Lo level. By contrast, if the humidity difference $\Delta X$ becomes less than the humidity threshold X4 during operation of the refrigerant circuit 200B at Lo level, it can be determined that there is more than sufficient dehumidification capacity and evaporating temperature can be thus further increased. Accordingly, to decrease dehumidification capacity, the control device 50B may transition from Lo level to Hi level.

Figure 19:
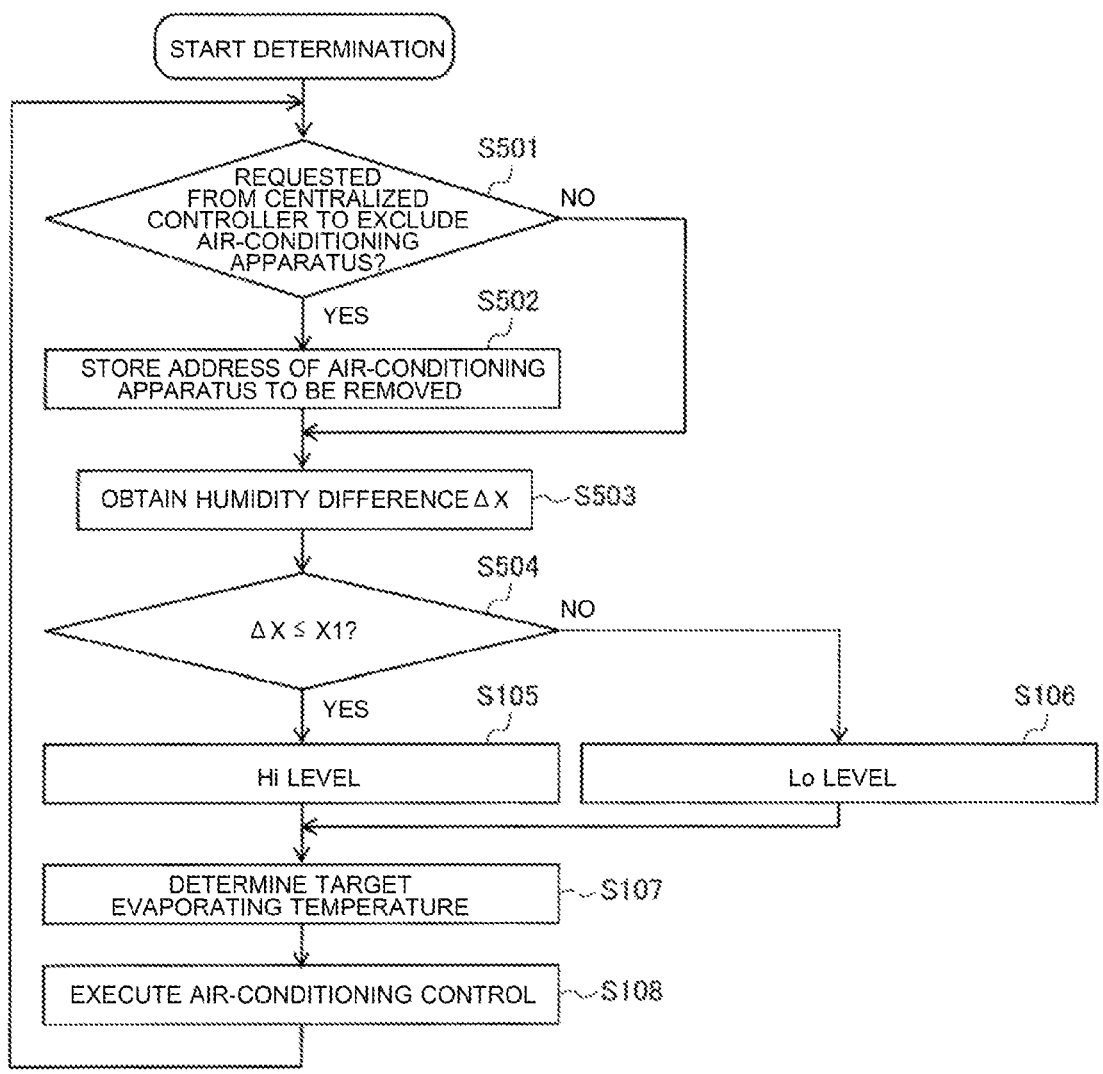
FIG. 19 is a flowchart illustrating operation of the air-conditioning system illustrated in FIG. 17.

FIG. 19 is a flowchart illustrating operation of the air-conditioning system illustrated in FIG. 17. The following describes, with reference to FIG. 19, a process performed by the centralized controller 20 and the control device 50B of the air-conditioning system 100E. Steps similar to those of Embodiment 1 described above will be designated by identical reference signs as those in FIG. 9 to avoid repetitive description. The following description is directed to a case in which every indoor unit 1 of the refrigerant circuit 200B is installed in a place with low air-conditioning priority.

First, a user performs, via the input unit 21a of the centralized controller 20, a selection operation to exclude every indoor unit 1 of the second refrigerant system. The data processing unit 22b then transmits, to the control device 50B, the address of the indoor unit 1 selected as the indoor unit 1 to be excluded. Then, the acquisition processing unit 52 of the control device 50B recognizes that there has been a request to exclude the indoor unit 1 of the second refrigerant system (step S501: YES), and stores, into the storage unit 55, the address of the indoor unit 1 selected as the indoor unit 1 to be excluded. At this time, the acquisition processing unit 52 excludes, from monitored-apparatus information, the address of the indoor unit 1 selected as the indoor unit 1 to be excluded, thus updating the monitored-apparatus information (step S502).

Subsequently, based on the monitored-apparatus information updated by the acquisition processing unit 52, the difference calculation unit 53a acquires the indoor absolute humidity Xa from the temperature and humidity sensor of the ventilator 3 of the second refrigerant system. Then, the difference calculation unit 53a subtracts the indoor target absolute humidity Xa_tgt from the acquired indoor absolute humidity Xa to obtain the humidity difference $\Delta X$ (step S503).

Subsequently, the level determination unit 53b determines whether a humidity condition is satisfied, the humidity condition being that the humidity difference $\Delta X$ is less than or equal to the humidity threshold X1 (step S504). If the humidity difference $\Delta X$ satisfies the humidity condition (step S504: YES), the level determination unit 53b sets level setting information to Hi level (step S105). If the humidity difference $\Delta X$ does not satisfy the humidity condition (step S504: NO), the level determination unit 53b sets level setting information to Lo level (step S106). Then, the air-conditioning system 100E executes steps S107 and S108 in a manner similar to that in FIG. 9.

If the user has not performed a selection operation to exclude every indoor unit 1 of the second refrigerant system (step S501: NO), the difference calculation unit 53a identifies, based on the current monitored-apparatus information, an air-conditioning apparatus from which the indoor temperature Ta and the indoor absolute humidity Xa are acquired, and obtains the temperature difference ΔT and the humidity difference ΔX (step S103 in FIG. 9). Then, the air-conditioning system 100E executes steps from S104 to S108 illustrated in FIG. 9 in a manner similar to those in Embodiment 1. In this regard, an air-conditioning apparatus whose address is included in the monitored-apparatus information at the time of transition to step S503 or step S103 corresponds to an air-conditioning apparatus that satisfies a specific criterion. The air-conditioning system 100E may perform, in addition to the series of steps mentioned above, the series of steps S201 to S203 according to Embodiment 2 illustrated in FIG. 11. In the case of the air-conditioning system 100D, steps S501 and S502 may be omitted.

As described above, with the air-conditioning system according to Embodiment 5, if every indoor unit 1 in any one refrigerant circuit has a low air-conditioning priority, or if every air-conditioning apparatus in any one refrigerant circuit is the ventilator 3, the target evaporating temperature Te is determined based solely on the humidity difference ΔX obtained for the ventilator 3 in that refrigerant circuit. This helps achieve energy saving even for cases in which the temperature difference ΔT is unknown. Other effects and alternative configurations are similar to those of Embodiment 1. It is to be noted, however, that the air-conditioning system according to each of Embodiments 1 to 4 may also perform step S504 and processes associated with step S504, instead of step S104 and processes associated with step S104.

<Modifications>

Figure 20:
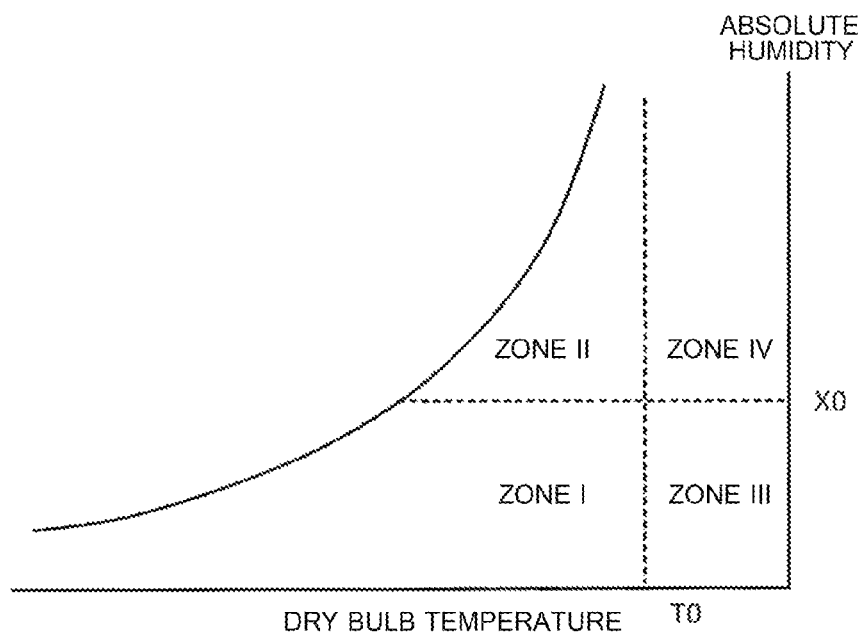
FIG. 20 is a psychrometric chart illustrating the division of zones for the air-conditioning system according to a modification of Embodiment 5 of the present invention.
Figure 21:
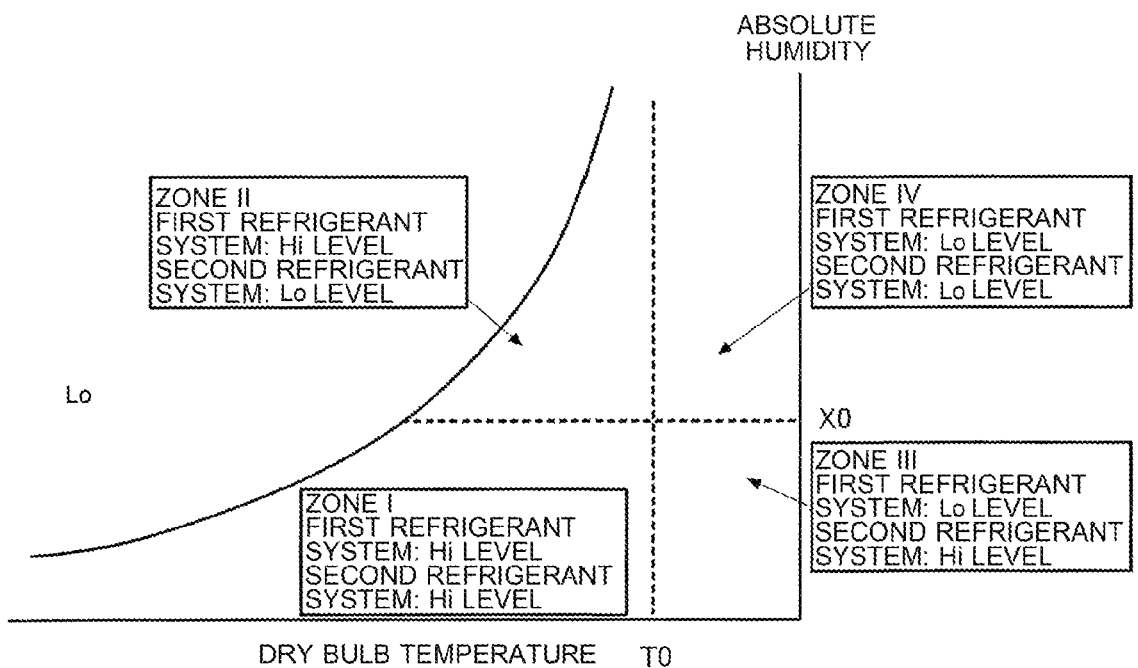
FIG. 21 is a psychrometric chart illustrating corresponding evaporating temperature levels for four zones illustrated in FIG. 20.

FIG. 20 is a psychrometric chart illustrating the division of zones for an air-conditioning system according to a modification of Embodiment 5 of the present invention. FIG. 21 is a psychrometric chart illustrating the corresponding evaporating temperature levels for four zones illustrated in FIG. 20. As illustrated in FIGS. 20 and 21, the air-conditioning system according to the modification is capable of switching the respective evaporating temperature levels of the first and second refrigerant systems based on four zones divided in accordance with dry bulb temperature and absolute humidity.

As illustrated in FIG. 20, the values of temperature and humidity detected by the OA temperature and humidity detection unit 31 are divided into four zones, Zones I to IV, which are defined with a threshold T0 of dry bulb temperature and a threshold X0 of absolute humidity serving as zone boundaries. Values falling within Zone I indicate that the outside air is at a low temperature and a low humidity, and thus correspond to a low sensible heat load condition and a low latent heat load condition. Values falling within Zone II indicate that the outside air is at a low temperature and a high humidity, and thus correspond to a low sensible heat load condition and a high latent heat load condition. Values falling within Zone III indicate that the outside air is at a high temperature and a low humidity, and thus correspond to a high sensible heat load condition and a low latent heat load condition. Values falling within Zone IV indicate that the outside air is at a high temperature and a high humidity, and thus correspond to a high sensible heat load condition and a high latent heat load condition.

Under the low sensible heat load condition in each of Zones I and II, the first refrigerant system, which controls sensible heat, is subjected to a low sensible heat load. It is thus possible to increase the evaporating temperature of the first refrigerant system to decrease cooling capacity. Accordingly, the evaporating temperature level of the first refrigerant system can be set to Hi level as illustrated in FIG. 21. Under the high sensible heat load condition in each of Zones III and IV, the first refrigerant system, which controls sensible heat, is subjected to a high sensible heat load. It is thus necessary to decrease the evaporating temperature of the first refrigerant system to increase cooling capacity. Accordingly, the evaporating temperature level of the first refrigerant system level needs to be set to Lo level as illustrated in FIG. 21.

Under the low latent heat load condition in each of Zones I and III, the second refrigerant system, which controls latent heat, is subjected to a low latent heat load. It is thus possible to increase the evaporating temperature of the second refrigerant system to decrease dehumidification capacity. Accordingly, the evaporating temperature level of the second refrigerant system can be set to Hi level as illustrated in FIG. 21. Under the high latent heat load condition in each of Zones II and IV, the second refrigerant system, which controls latent heat, is subjected to a high latent heat load. It is thus necessary to decrease the evaporating temperature of the second refrigerant system to increase dehumidification capacity. Accordingly, the evaporating temperature level of the second refrigerant system level needs to be set to Lo level as illustrated in FIG. 21.

For each zone, the corresponding threshold T0 of dry bulb temperature and the corresponding threshold X0 of absolute humidity are determined as follows. The threshold T0 is the maximum value of outside-air temperature at which a sensible heat load can be handled with the target evaporating temperature Te of the first refrigerant system being set to Tei_hi_min, which is Hi level. That is, at or below the threshold T0, a target temperature can be reached even if the evaporating temperature is in Hi-level range. As for the actual sensible heat load, it is necessary to take into account not only the temperature and humidity condition of outdoor air but also heat internally generated by human bodies, lighting equipment, or other objects. In this regard, the amount of heat internally generated by human bodies, lighting equipment, or other objects can be estimated to some extent for each individual property such as a building or an apartment, and fluctuates relatively slightly. Accordingly, T0 can be calculated by using such a value estimated for each individual property.

The threshold X0 is the maximum value of outside-air absolute humidity at which a latent heat load can be handled with the target evaporating temperature Te of the second refrigerant system being set to Tev_hi_min, which is Hi level. That is, at or below the threshold X0, a target temperature can be reached even if the evaporating temperature is in Hi-level range. As for the actual latent heat load, it is necessary to take into account not only the temperature and humidity condition of outdoor air but also heat internally generated by human bodies, lighting equipment, or other objects. In this regard, the amount of heat internally generated by human bodies, lighting equipment, or other objects can be estimated to some extent for each individual property such as a building or an apartment, and fluctuates relatively slightly. Accordingly, X0 can be calculated by using such a value estimated for each individual property.

Figure 22:
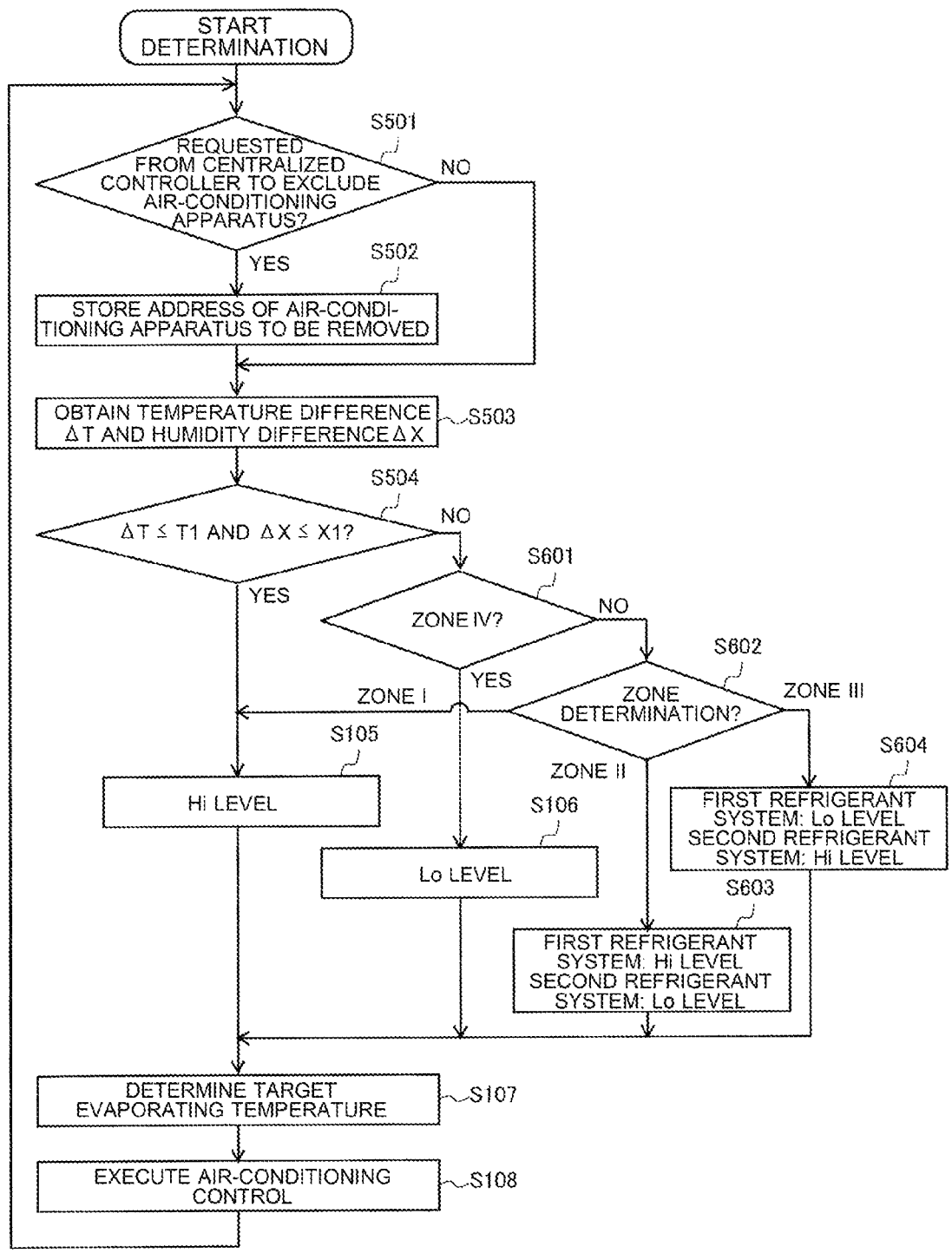
FIG. 22 illustrates operation of the air-conditioning system according to the modification of Embodiment 5 of the present invention.

FIG. 22 illustrates operation of the air-conditioning system according to the modification of Embodiment 5 of the present invention. Based on the configuration of the air-conditioning system 100E, an additional adjustment process for evaporating temperature level based on the four zones according to the modification will be described with reference to FIG. 22. Steps similar to those in FIG. 19 will be designated by identical reference signs to avoid repetitive description.

The air-conditioning system 100E according to the modification executes the series of steps from S501 to S504 in a manner similar to FIG. 22. Then, if the humidity difference ΔX satisfies a humidity condition (step S504: YES), the level determination unit 53b of the control device 50B sets the evaporating temperature levels of both the first and second refrigerant systems to Hi level (step S105).

If the humidity difference ΔX does not satisfy a humidity condition (step S504: NO), the level determination unit 53b acquires the temperature and humidity of outside air from the OA temperature and humidity detection unit 31, and executes zone determination, which determines which one of the four zones the acquired temperature and humidity values correspond to. A case in which the humidity difference ΔX does not satisfy a humidity condition refers to when at least one of the following conditions is satisfied: the temperature difference ΔT is greater than the temperature threshold T1; and the humidity difference ΔX is greater than the humidity threshold X1.

That is, if the acquired values correspond to Zone IV (step S601: YES), the level determination unit 53b sets the evaporating temperature levels of both the first and second refrigerant systems to Lo level. For a case in which the acquired values do not correspond to Zone IV (step S601: NO), if the acquired values correspond to Zone I (step S602: Zone I), the level determination unit 53b proceeds to step S105 (step S105). If the acquired values correspond to Zone II (step S602: Zone II), the level determination unit 53b sets the evaporating temperature level of the first refrigerant system to Hi level, and sets the evaporating temperature level of the second refrigerant system to Lo level (step S603). If the acquired values correspond to Zone III (step S602: Zone III), the level determination unit 53b sets the evaporating temperature level of the first refrigerant system to Lo level, and sets the evaporating temperature level of the second refrigerant system to Hi level (step S604).

Then, the air-conditioning system 100E executes steps S107 and S108 in a manner similar to FIG. 22. The air-conditioning system 100E may perform, in addition to the series of steps mentioned above, the series of steps S201 to S203 according to Embodiment 2 illustrated in FIG. 11.

As described above, with the air-conditioning according to the modification, the target temperature adjustment unit 53 acquires a detection value from the OA temperature and humidity detector 31 if a temperature and humidity condition is not satisfied. When outside air is at a low temperature and a low humidity, the target temperature adjustment unit 53 determines the target evaporating temperature Te by using high target temperature derivation information for each of the first refrigerant system and the second refrigerant system. When outside air is at a low temperature and a high humidity, the target temperature adjustment unit 53 determines the target evaporating temperature Te by using high target temperature derivation information for the first refrigerant system, and determines the target evaporating temperature Te by using low target temperature derivation information for the second refrigerant system. When outside air is at a high temperature and a low humidity, the target temperature adjustment unit 53 determines the target evaporating temperature Te by using low target temperature derivation information for the first refrigerant system, and determines the target evaporating temperature Te by using high target temperature derivation information for the second refrigerant system. When outside air is at a high temperature and a high humidity, the target temperature adjustment unit 53 determines the target evaporating temperature Te by using low target temperature derivation information for each of the first refrigerant system and the second refrigerant system. That is, the air-conditioning system according to the modification allows for an increased number of patterns in which evaporating temperature can be increased, thus achieving further energy saving with enhanced flexibility.

Although the foregoing description of the modification is directed to an exemplary case in which the control device 50A and the control device 50B perform processes such as setting of evaporating temperature level in cooperation with each other, this is not to be construed to be restrictive. The air-conditioning systems 100D and 100E may each include, inside or outside the outdoor unit 2 or the outdoor unit 4, a controller that has both the function of the control device 50A and the function of the control device 50B.

The embodiments described above represent specific preferred implementations of an air-conditioning system, and the technical scope of the present invention is not limited to these implementations. For example, in the figures used in the foregoing description, the relative sizes of various components may not be drawn to scale in some cases. Further, for plural apparatuses or other such features of the same kind differentiated by, for example, suffixes, such suffixes are often omitted for cases in which there is no particular need to differentiate or identify individual apparatuses or features.

In addition, although FIG. 1 depicts an exemplary case in which the air-conditioning system 100 includes three indoor units 1 and a single ventilator 3, this is not to be construed to be restrictive. The air-conditioning system 100 may include one, two, or four indoor units 1. Likewise, the air-conditioning system 100 may include two or more ventilators 3. The same applies to the air-conditioning system according to each of Embodiments 2 to 5. Although FIGS. 2 and 16 each depict an exemplary case in which the first expansion valve 14a is disposed in the indoor unit 1 and the second expansion valve 14b is disposed in the ventilator 3, this is not to be construed to be restrictive. Alternatively, at least one of the first expansion valve 14a and the second expansion valve 14b may be disposed in the outdoor unit 2 or the outdoor unit 4.

Although the foregoing description of the above-mentioned embodiments is directed to an exemplary case in which the centralized controller 20, 20A, or 20B includes the input and display unit 21 implemented by a touch screen, this is not to be construed to be restrictive. The input and display unit 21 may include the input unit 21a and the display unit 21b that are disposed separately from each other, the input unit 21a including physical buttons or other components, the display unit 21b being implemented by, for example, a liquid crystal display.

Although FIG. 7 depicts an exemplary case in which target temperature derivation information is a graph, this is not to be construed to be restrictive. Target temperature derivation information may be information in the form of a table in which the temperature difference ΔT and the target evaporating temperature Te are associated with each other in a manner similar to the graph illustrated in FIG. 7. Although FIG. 18 depicts an exemplary case in which target temperature derivation information is a graph, this is not to be construed to be restrictive. Target temperature derivation information may be information in the form of a table in which the humidity difference ΔX and the target evaporating temperature Te are associated with each other in a manner similar to the graph illustrated in FIG. 18.

Although the foregoing description of the above-mentioned embodiments is directed to an exemplary case with two separate evaporating temperature levels, Hi level and Lo level, this is not to be construed to be restrictive. Alternatively, three or more evaporating temperature levels may be set. Although the foregoing description of the above-mentioned embodiments is directed to an exemplary case in which the humidity detected by a temperature and humidity sensor or other devices is absolute humidity, this is not to be construed to be restrictive. Alternatively, a temperature and humidity sensor or other devices may detect relative humidity. However, a computation using relative humidity is subject to the influence of temperature, with the result that comfort varies with indoor temperature. For this reason, it is desirable for a temperature and humidity sensor or other devices to detect absolute humidity. Although the foregoing description of the above-mentioned embodiments is directed to an exemplary case in which each air-conditioning apparatus includes a "temperature and humidity sensor" that detects the temperature and absolute humidity of air in the air-conditioned space S, this is not to be construed to be restrictive. Each air-conditioning apparatus may include a temperature sensor that detects the temperature of air in the air-conditioned space S, and a humidity sensor that detects the absolute humidity of air in the air-conditioned space S.

In the above-mentioned embodiments, basically, a detection value detected by the temperature and humidity sensor of a representative air-conditioning apparatus is used to determine whether a temperature and humidity condition or a humidity condition is satisfied. However, this is not to be construed to be restrictive. In one exemplary configuration, for each of detection values detected by the respective temperature and humidity sensors of all air-conditioning apparatuses that satisfy a specific criterion, whether the detection value satisfies a temperature and humidity condition or a humidity condition may be determined, and evaporating temperature levels may be switched accordingly. In another exemplary configuration, based on the mean value of detection values detected by the respective temperature and humidity sensors of all air-conditioning apparatuses that satisfy a specific criterion, whether the mean value satisfies a temperature and humidity condition or a humidity condition may be determined, and evaporating temperature levels may be switched accordingly.

REFERENCE SIGNS LIST 1, 1001 indoor unit 2, 1002 outdoor unit 3, 1003 ventilator 4 outdoor unit 11, 11A, 11B compressor 12, 12A, 12B four-way valve 13, 13A, 13B outdoor heat exchanger 14a first expansion valve 14b second expansion valve indoor heat exchanger 16, 16A, 16B outdoor fan 17 indoor fan 18 ventilator heat exchanger 19a supply fan 19b exhaust fan 20, 20A, 20B centralized controller 21 input and display unit 21a input unit 21b display unit 22 control unit 22a display processing unit 22b data processing unit storage unit 30 total heat exchanger 31 OA temperature and humidity detection unit 32 RA temperature and humidity detection unit 42 evaporating temperature detection unit 43 suction temperature and humidity detection unit 50, 50B, 50C control device 51 control unit 52 acquisition processing unit 53 target temperature adjustment unit 53a difference calculation unit 53b level determination unit 53c target temperature determination unit 54 air-conditioning control unit 55 storage unit 60 communication device 61 humidity sensor 100, 100C, 100D, 100E, 110, 1000 air-conditioning system 100A first air-conditioning system 100B second air-conditioning system 102, 102a, 102b refrigerant pipe 200, 200A, 200B refrigerant circuit T0 threshold T1 temperature threshold T2 comfort temperature threshold Ta indoor temperature Ta_tgt indoor target temperature Te target evaporating temperature Te_max maximum evaporating temperature Te_min minimum evaporating temperature X0 threshold X1 humidity threshold X2 comfort humidity threshold X3, X4 humidity threshold Xa indoor absolute humidity Xa_tgt indoor target absolute humidity ΔT, ΔTn temperature difference ΔX, ΔXn humidity difference

The invention claimed is:

1. An air-conditioning system comprising:
a refrigerant system in which an outdoor unit, an indoor unit, and a ventilator are connected by a refrigerant pipe and in which refrigerant circulates; and
a controller configured to control the refrigerant system,
wherein the refrigerant system includes a compressor, an outdoor heat exchanger, a first expansion valve, an indoor heat exchanger, a second expansion valve, and a ventilator cooler,
wherein the outdoor unit includes the compressor, and the outdoor heat exchanger,
wherein the indoor unit includes the indoor heat exchanger,
wherein the ventilator includes the ventilator cooler,
wherein the indoor unit and the ventilator are each provided with a temperature and humidity detector configured to detect a temperature and a humidity of air in an air-conditioned space and output a detection value indicative thereof, and
wherein the controller includes
a target temperature adjustment circuit configured to identify one of the indoor unit or the ventilator that satisfies a specific criterion, which identifies the indoor unit or the ventilator located at a place with a high air-conditioning priority corresponding to a magnitude of effect on comfort, and to adjust a target evaporating temperature based on the detection value detected by the temperature and humidity detector provided to the identified indoor unit or the ventilator, wherein the target temperature adjustment circuit does not use the detection value detected by the temperature and humidity detector provided to the other of the indoor unit or the ventilator not identified as satisfying the specific criterion to adjust the target evaporating temperature, and
an air-conditioning control circuit configured to control the refrigerant system such that an evaporating temperature of the indoor unit and an evaporating temperature of the ventilator are both set to be equal to the target evaporating temperature adjusted by the target temperature adjustment circuit.

2. The air-conditioning system of claim 1, further comprising
a control apparatus configured to transmit specific criterion information to the controller, the specific criterion information corresponding to the specific criterion,
wherein the target temperature adjustment circuit identifies the indoor unit or the ventilator that satisfies the specific criterion based on the specific criterion information transmitted from the control apparatus.

3. The air-conditioning system of claim 2,
wherein the control apparatus accepts a user's operation of selecting the indoor unit or the ventilator whose air-conditioning priority based on a location within the air-conditioned space is low, and transmits, as the specific criterion information, identification information of the selected the indoor unit or the ventilator to the controller.

4. The air-conditioning system of claim 2,
wherein the control apparatus acquires detection information obtained by a human presence sensor disposed in the air-conditioned space, extracts an area where no human is present for a predetermined period of time or more based on the acquired detection information, and transmits, as the specific criterion information, identification information of the indoor unit or the ventilator that corresponds to the extracted area to the controller.

5. The air-conditioning system of claim 3,
wherein the controller further includes
a storage circuit configured to store monitored-apparatus information, the monitored-apparatus information including the identification information of the indoor unit and the identification information of the ventilator, and
an acquisition processing circuit configured to update the monitored-apparatus information by excluding, from the monitored-apparatus information, the identification information serving as the specific criterion information, and
wherein the target temperature adjustment circuit identifies the indoor unit or the ventilator that satisfies the specific criterion by using the monitored-apparatus information that is updated by the acquisition processing circuit.

6. The air-conditioning system of claim 5,
wherein the target temperature adjustment circuit acquires a temperature and a humidity of the air-conditioned space from the temperature and humidity detector provided to the indoor unit or the ventilator that satisfies the specific criterion, obtains a temperature difference and a humidity difference, the temperature difference being a difference between the acquired temperature and a target temperature, the humidity difference being a difference between the acquired humidity and a target humidity, and adjusts the target evaporating temperature by using at least one of the obtained temperature difference and the obtained humidity difference.

7. The air-conditioning system of claim 6,
wherein the storage circuit stores target temperature derivation information, the target temperature derivation information associating the temperature difference or the humidity difference with the target evaporating temperature,
wherein the target temperature derivation information includes
high target temperature derivation information representing an evaporating temperature set to a high value, and
low target temperature derivation information representing an evaporating temperature set lower than the high target temperature derivation information, and
wherein if the temperature difference is less than or equal to a temperature threshold and the humidity difference is less than or equal to a humidity threshold, the target temperature adjustment circuit determines the target evaporating temperature by using the high target temperature derivation information.

8. The air-conditioning system of claim 7, further comprising
an outside-air temperature and humidity detector configured to detect a temperature and a humidity of outside air,
wherein the outdoor unit of the refrigerant system comprises two outdoor units,
wherein the refrigerant system includes a first refrigerant system in which one of the two outdoor units and the indoor unit are connected by the refrigerant pipe and in which refrigerant circulates, and a second refrigerant system in which an other one of the two outdoor units and the ventilator are connected by the refrigerant pipe and in which the refrigerant circulates, and
wherein the target temperature adjustment circuit is configured to,
if at least one of two conditions is satisfied, the two conditions being that the temperature difference is greater than the temperature threshold and that the humidity difference is greater than the humidity threshold, acquire a detection value from the outside-air temperature and humidity detector,
if the temperature of the outside air is below the temperature threshold and the humidity of the outside air is below the a humidity threshold, determine the target evaporating temperature by using the high target temperature derivation information for each of the first refrigerant system and the second refrigerant system,
if the temperature of the outside air is below the temperature threshold and the humidity of the outside air is above the humidity threshold, determine the target evaporating temperature by using the high target temperature derivation information for the first refrigerant system, and determine the target evaporating temperature by using the low target temperature derivation information for the second refrigerant system,
if the temperature of the outside air is above the temperature threshold and the humidity of the outside air is below the humidity threshold, determine the target evaporating temperature by using the low target temperature derivation information for the first refrigerant system, and determine the target evaporating temperature by using the high target temperature derivation information for the second refrigerant system, and
if the temperature of the outside air is above the temperature threshold and the humidity of the outside air is above the humidity threshold, determine the target evaporating temperature by using the low target temperature derivation information for each of the first refrigerant system and the second refrigerant system.

9. The air-conditioning system of claim 6,
wherein the target temperature adjustment circuit executes adjustment of the target evaporating temperature only if the temperature difference is less than a comfort temperature threshold and the humidity difference is less than a comfort humidity threshold, the comfort temperature threshold being set greater than a temperature threshold, the comfort humidity threshold being set greater than a humidity threshold.

10. The air-conditioning system of claim 5,
wherein the control apparatus has a function of communicating with an other ventilator, the other ventilator being disposed in an other refrigerant system and including a humidity sensor configured to detect the humidity of the air-conditioned space, wherein, in response to accepting a user's selection operation to exclude the ventilator and add the other ventilator, the control apparatus transmits the identification information of the ventilator and the identification information of the other ventilator to the controller as the specific criterion information, wherein the acquisition processing circuit updates the monitored-apparatus information by excluding the identification information of the ventilator from the monitored-apparatus information and adding the identification information of the other ventilator to the monitored-apparatus information, and wherein the target temperature adjustment circuit acquires the temperature of the air in the air-conditioned space from the temperature and humidity detector provided to the indoor unit that satisfies the specific criterion, obtains a temperature difference between the acquired temperature and a target temperature, acquires the humidity of the air in the air-conditioned space from the humidity sensor of the other ventilator, obtains a humidity difference between the acquired humidity and a target humidity, and adjusts the target evaporating temperature by using at least one of the obtained temperature difference and the obtained humidity difference.

11. The air-conditioning system of claim 5, further comprising a communication device including a humidity sensor configured to detect the humidity of the air-conditioned space, wherein, in response to accepting a user's selection operation to exclude the ventilator and add the communication device, the control apparatus transmits the identification information of the ventilator and identification information of the communication device to the controller as the specific criterion information, wherein the acquisition processing circuit updates the monitored-apparatus information by excluding the identification information of the ventilator from the monitored-apparatus information and adding the identification information of the communication device to the monitored-apparatus information, and wherein the target temperature adjustment circuit acquires the temperature of the air in the air-conditioned space from the temperature and humidity detector provided to the indoor unit that satisfies the specific criterion, obtains a temperature difference between the acquired temperature and a target temperature, acquires the humidity of the air in the air-conditioned space from the humidity sensor of the communication device, obtains a humidity difference between the acquired humidity and a target humidity, and adjusts the target evaporating temperature by using at least one of the obtained temperature difference and the obtained humidity difference.

12. The air-conditioning system of claim 5, wherein, in response to accepting a user's selection operation to exclude the indoor unit and another indoor unit, the control apparatus transmits identification information of every one of the indoor units to the controller as the specific criterion information, wherein the acquisition processing circuit excludes the identification information of every one of the indoor units from the monitored-apparatus information, and wherein the target temperature adjustment circuit acquires the humidity of air in the air-conditioned space from the temperature and humidity detector provided to the ventilator, obtains a humidity difference between the acquired humidity and a target humidity, and adjusts the target evaporating temperature by using the obtained humidity difference.

13. The air-conditioning system of claim 12, wherein the storage circuit stores target temperature derivation information, the target temperature derivation information associating the humidity difference with the target evaporating temperature, wherein the target temperature derivation information includes high target temperature derivation information representing an evaporating temperature set to a high value, and low target temperature derivation information representing an evaporating temperature set lower than the high target temperature derivation information, and wherein if the humidity difference is less than or equal to a humidity threshold, the target temperature adjustment circuit determines the target evaporating temperature by using the high target temperature derivation information.

14. The air-conditioning system of claim 13, further comprising an outside-air temperature and humidity detector configured to detect a temperature and a humidity of outside air, wherein the outdoor unit of the refrigerant system comprises two outdoor units, wherein the refrigerant system includes a first refrigerant system in which one of the two outdoor units and the indoor unit are connected by the refrigerant pipe and in which the refrigerant circulates, and a second refrigerant system in which an other one of the two outdoor units and the ventilator are connected by the refrigerant pipe and in which the refrigerant circulates, and wherein the target temperature adjustment circuit is configured to, if a condition that the humidity difference is greater than the humidity threshold is satisfied, acquire a detection value from the outside-air temperature and humidity detector, if the temperature of the outside air is below a temperature threshold and the humidity of the outside air is below the humidity threshold, determine the target evaporating temperature by using the high target temperature derivation information for each of the first refrigerant system and the second refrigerant system, if the temperature of the outside air is below the temperature threshold and the humidity of the outside air is above the humidity threshold, determine the target evaporating temperature by using the high target temperature derivation information for the first refrigerant system, and determine the target evaporating temperature by using the low target temperature derivation information for the second refrigerant system, if the temperature of the outside air is above the temperature threshold and the humidity of the outside air is below the humidity threshold, determine the target evaporating temperature by using the low target temperature derivation information for the first refrigerant system, and determine the target evaporating temperature by using the high target temperature derivation information for the second refrigerant system, and if the temperature of the outside air is above the temperature threshold and the humidity of the outside air is above the humidity threshold, determine the target evaporating temperature by using the low target temperature derivation information for each of the first refrigerant system and the second refrigerant system.

15. An air-conditioning system comprising:
a refrigerant system in which an outdoor unit, a first indoor unit, a second indoor unit, and a ventilator each have a refrigerant pipe in which refrigerant circulates; and
a controller configured to control the refrigerant system,
wherein the refrigerant system includes a compressor, an outdoor heat exchanger, a first expansion valve, a first indoor heat exchanger, a second indoor heat exchanger, a second expansion valve, and a ventilator cooler,
wherein the outdoor unit includes the compressor, and the outdoor heat exchanger,
wherein the first indoor unit includes the first indoor heat exchanger,
wherein the second indoor unit includes the second indoor heat exchanger,
wherein the ventilator includes the ventilator cooler,
wherein the first indoor unit is provided with a first temperature and humidity detector, the second indoor unit is provided with a second temperature and humidity detector, and the ventilator is provided with a third temperature and humidity detector,
wherein the first, second, and third temperature and humidity detectors are each configured to detect a temperature and a humidity of air in an air-conditioned space and output a detection value indicative thereof, and
wherein the controller includes
a target temperature adjustment circuit configured to identify either the first indoor unit or the second indoor unit as satisfying a specific criterion, which identifies the first indoor unit or the second indoor unit as being located at a place with a high air-conditioning priority corresponding to a magnitude of effect on comfort, and to adjust a target evaporating temperature based on the detection value detected by the temperature and humidity detector provided to the identified first indoor unit or the second indoor unit, wherein the target temperature adjustment circuit does not use the detection value detected by the temperature and humidity detector provided to the other of the first indoor unit or the second indoor unit identified as not satisfying the specific criterion to adjust the target evaporating temperature, and
an air-conditioning control circuit configured to control an evaporating temperature of the first indoor unit and an evaporating temperature of the second indoor unit are both set to be equal to the target evaporating temperature adjusted by the target temperature adjustment circuit.

* * * * *